US011831583B2

(12) United States Patent
Li et al.

(10) Patent No.: US 11,831,583 B2
(45) Date of Patent: Nov. 28, 2023

(54) SIDELINK CROSS-CARRIER CSI REPORT

(71) Applicant: QUALCOMM Incorporated, San Diego, CA (US)

(72) Inventors: Qing Li, Princeton Junction, NJ (US); Hong Cheng, Basking Ridge, NJ (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 201 days.

(21) Appl. No.: 17/370,885

(22) Filed: Jul. 8, 2021

(65) Prior Publication Data

US 2023/0009560 A1 Jan. 12, 2023

(51) Int. Cl.
*H04L 5/00* (2006.01)
*H04W 28/08* (2023.01)
*H04W 72/40* (2023.01)

(52) U.S. Cl.
CPC .......... *H04L 5/0098* (2013.01); *H04L 5/0048* (2013.01); *H04W 28/0875* (2020.05); *H04W 72/40* (2023.01)

(58) Field of Classification Search
CPC ... H04L 5/0091; H04L 5/0096; H04L 5/0098; H04L 5/003; H04L 5/0048; H04L 5/0051; H04L 12/1863; H04L 43/00; H04L 43/06; H04L 1/0687; H04L 2012/6497; H04L 2027/0018; H04L 67/104; H04L 67/1091; H04W 24/00; H04W 24/10; H04W 72/40; H04W 28/0875
See application file for complete search history.

(56) References Cited

U.S. PATENT DOCUMENTS

2011/0305161 A1* 12/2011 Ekpenyong ............. H04L 5/001 370/252
2016/0142191 A1* 5/2016 Davydov .............. H04L 1/0029 370/329
2019/0081676 A1* 3/2019 Wei ...................... H04B 7/0417
2021/0028842 A1* 1/2021 Kim ..................... H04B 7/0628
2021/0143882 A1* 5/2021 Sarkis ................... H04W 80/02
2021/0328643 A1* 10/2021 Damnjanovic ....... H04W 24/10
2021/0377989 A1* 12/2021 Chae ..................... H04W 72/23
2021/0391907 A1* 12/2021 Wang ................... H04B 7/0639
2022/0014338 A1* 1/2022 Yoshioka .............. H04W 8/005
2022/0287006 A1* 9/2022 Yoshioka .............. H04W 24/10
2022/0361076 A1* 11/2022 Cheng ................... H04W 36/30
2022/0369345 A1* 11/2022 Aktas .................... H04W 72/20
2022/0394722 A1* 12/2022 Hwang ............... H04W 72/542
2022/0416969 A1* 12/2022 Lee ....................... H04L 5/0048
2023/0055200 A1* 2/2023 Yoshioka .................. H04L 1/18
(Continued)

*Primary Examiner* — Warner Wong
(74) *Attorney, Agent, or Firm* — Patterson & Sheridan LLP

(57) ABSTRACT

Aspects of the present disclosure relate to wireless communications, and more particularly, to techniques for cross-carrier sidelink channel state information (CSI) reporting. One aspect provides a method for wireless communication by a first user equipment (UE). The method generally includes transmitting, to a second UE, one or more channel state information (CSI) requests on one or more first component carriers (CCs), via one or more sidelink control informations (SCIs) that includes a CSI request flag and receiving, in response to the one or more CSI requests, one or more CSI reports from the second UE on one or more second CCs.

23 Claims, 18 Drawing Sheets

800

810

TRANSMIT, TO A SECOND UE, ONE OR MORE CHANNEL STATE INFORMATION (CSI) REQUESTS ON ONE OR MORE FIRST COMPONENT CARRIERS (CCS) VIA ONE OR MORE SIDELINK CONTROL INFORMATIONS (SCIS) THAT INCLUDES A CSI REQUEST FLAG

820

RECEIVE, IN RESPONSE TO THE ONE OR MORE CSI REQUESTS, ONE OR MORE CSI REPORTS FROM THE SECOND UE ON ONE OR MORE SECOND CCS

(56) References Cited

U.S. PATENT DOCUMENTS

2023/0095061 A1* 3/2023 Son ........................ H04W 24/10 370/252
2023/0114450 A1* 4/2023 Xue ...................... H04W 72/20 370/329
2023/0209535 A1* 6/2023 Park ........................ H04W 4/40 370/329
2023/0217287 A1* 7/2023 Son ........................ H04W 24/10 370/329

* cited by examiner

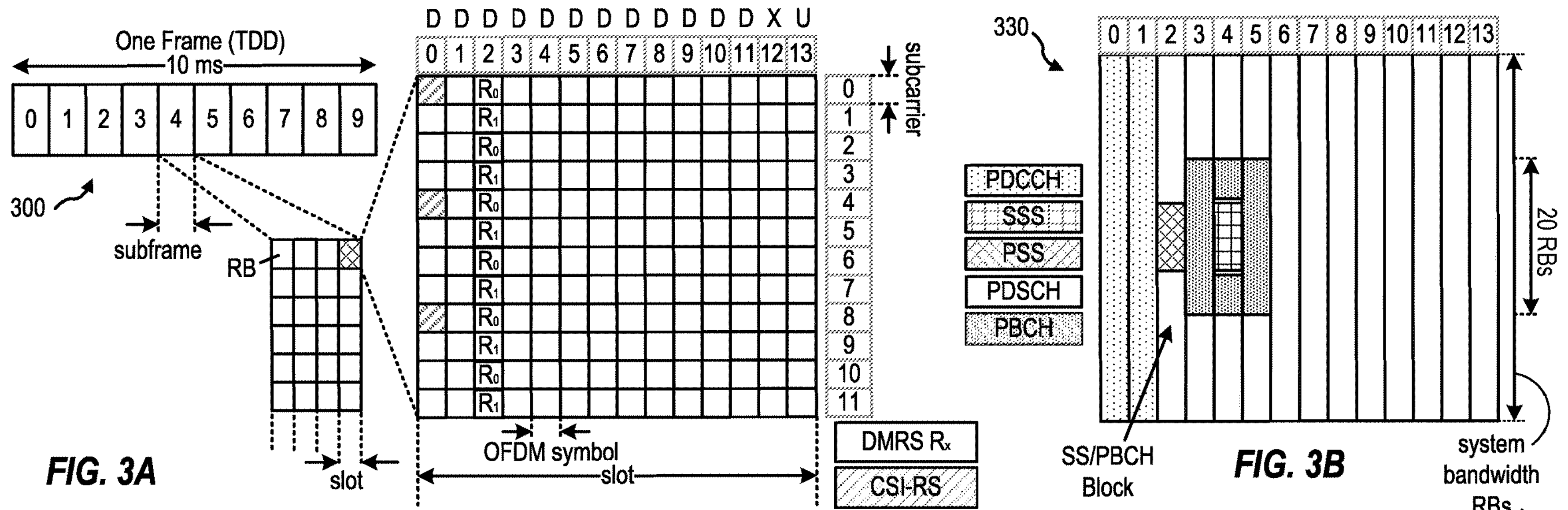
FIG. 3A
FIG. 3B
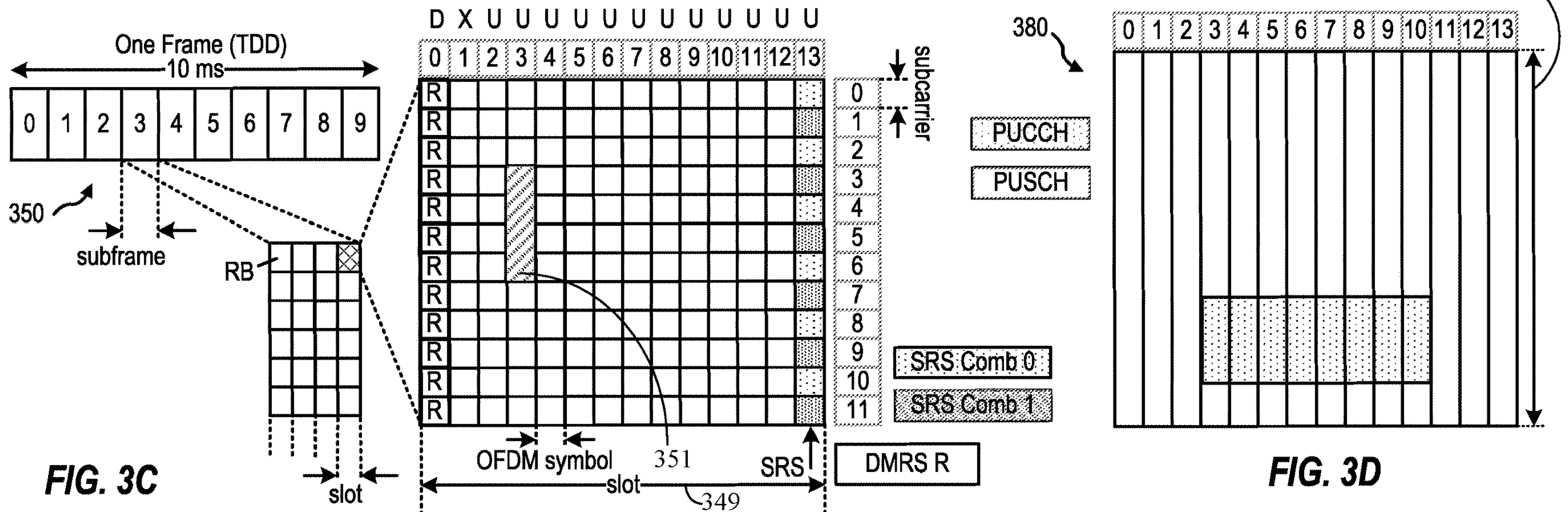
FIG. 3C
FIG. 3D

NW-side Flow Diagram

1400A

Implicit association with CSI requests

1400B

Explicit association with CSI requests

SIDELINK CROSS-CARRIER CSI REPORT

INTRODUCTION

Aspects of the present disclosure relate to wireless communications, and more particularly, to techniques for configuring sidelink communication.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect of the present disclosure provides a method for wireless communication by a first user-equipment (UE). The method generally includes transmitting, to a second UE, one or more channel state information (CSI) requests on one or more first component carriers (CCs) via one or more sidelink control informations (SCIs) that includes a CSI request flag, and receiving, in response to the one or more CSI requests, one or more CSI reports from the second UE on one or more second CCs.

One aspect provides a method for wireless communication by a second UE. The method generally includes receiving, from a first UE, one or more channel state information (CSI) requests on one or more first component carriers (CCs) via one or more sidelink control informations (SCIs) that includes a CSI request flag, and transmitting, in response to the one or more CSI requests, one or more CSI reports to the first UE on one or more second CCs.

One aspect provides a method for wireless communication by a network entity. The method generally includes configuring at least one of a first user-equipment (UE) or a second UE a set of component carriers (CCs) available for cross carrier channel state information (CSI) reporting, and signaling, at least one of the first UE or the second UE, an indication of a first one or more of the CCs to use for sending CSI requests or a second one or more of the CCs to use for sending CSI reports.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for cross-carrier CSI reporting for sidelink communications.

In some cases, one or more CSI reports may be transmitted or aggregated on one or more component carriers (CCs) that are different from the CCs on which the corresponding CSI requests are received. In such cases, the component carriers may be pre-configured or configured and may include licensed and/or unlicensed carriers for carrier aggregation. As will be described in greater detail below, the component carriers may be further semi-statically selected and activated or dynamically selected and indicated.

In some cases, the CSI reports may be conveyed via multiple CSI MAC CEs corresponding to multiple CSI requests, respectively. In other cases, the CSI reports may be conveyed via one CSI MAC CE that aggregates multiple CSI reports corresponding to multiple CSI requests.

The techniques presented herein may be applied in various bands utilized for NR. For example, for the higher band referred to as FR4 (e.g., 52.6 GHz-114.25 GHz), an OFDM waveform with very large subcarrier spacing (960 kHz-3.84 MHz) is required to combat severe phase noise. Due to the large subcarrier spacing, the slot length tends to be very short. In a lower band referred to as FR2 (24.25 GHz to 52.6 GHz) with 120 kHz SCS, the slot length is 125 μSec, while in FR4 with 960 kHz, the slot length is 15.6 μSec. In some cases, a frequency band referred to as FR2 x may be used. The techniques may also be applied in the FR1 band (4.1 GHz to 7.125 GHz), for example, may be used for channel state information (CSI) feedback, control messages, or on control plane signaling.

Introduction to Wireless Communication Networks

Figure 1:
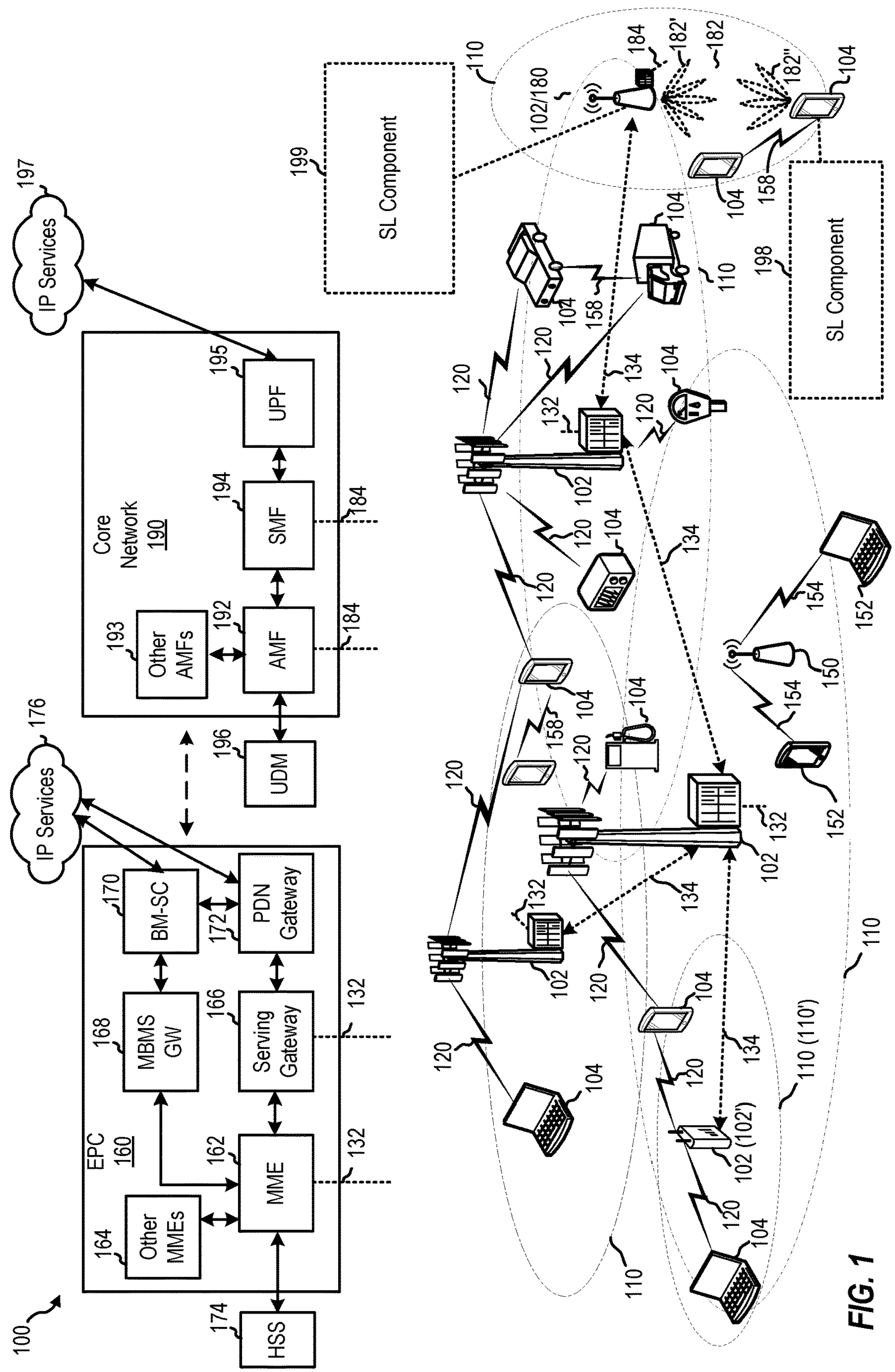
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102 (which may also be referred to herein as access node (AN) 102), user equipments (UEs) 104, an Evolved Packet Core (EPC) 160, and core network 190 (e.g., a 5G Core (5GC)), which interoperate to provide wireless communications services.

Base stations 102 may provide an access point to the EPC 160 and/or core network 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, Node B, eNB, an access point, a base transceiver station, a radio base station, a radio transceiver, or a transceiver function, or a transmit reception point (TRP) in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Figure 8:
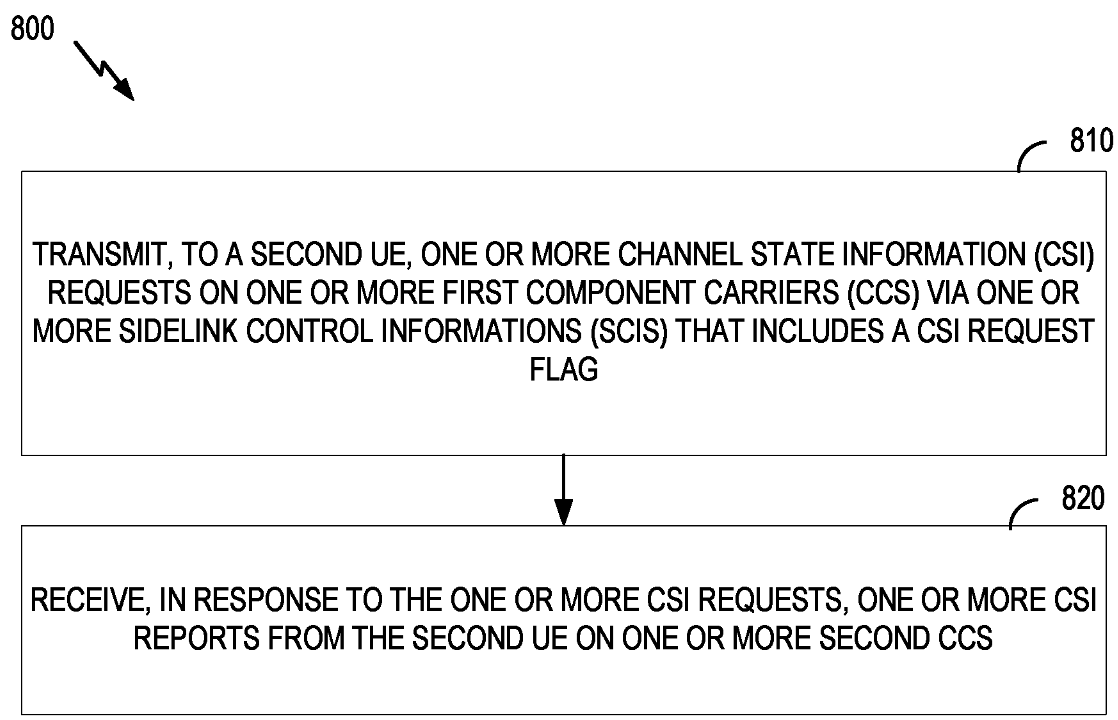
FIG. 8 is a flow diagram illustrating example operations for wireless communication by a first user equipment (UE), in accordance with certain aspects of the present disclosure.
Figure 9:
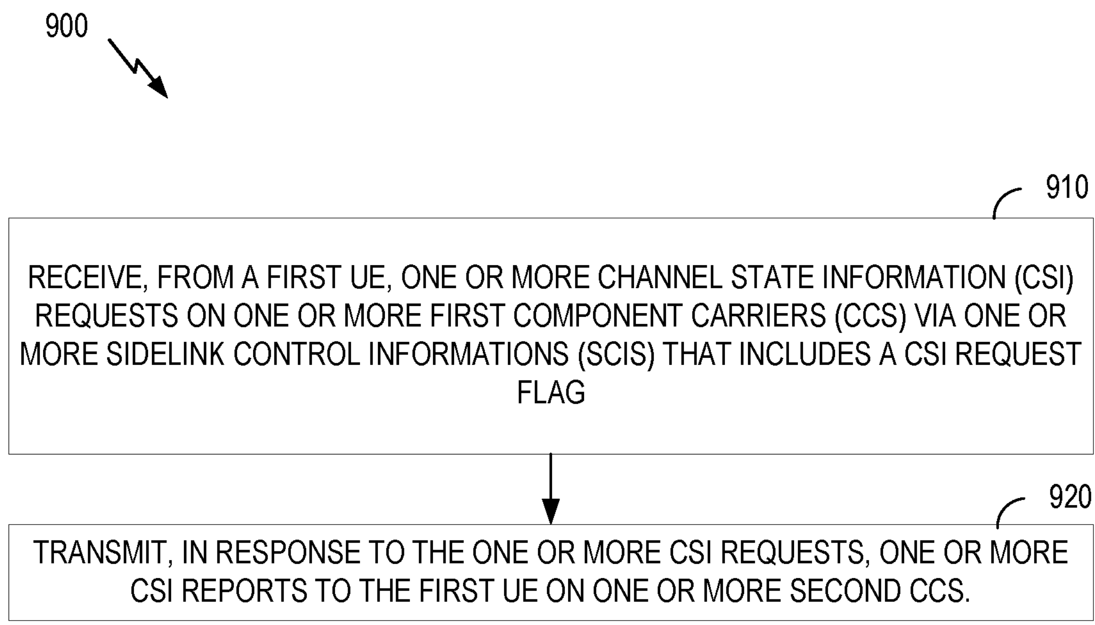
FIG. 9 is a flow diagram illustrating example operations for wireless communication by a second UE, in accordance with certain aspects of the present disclosure.

Wireless communication network 100 includes a SL component 198, which may configure a UE to perform operations for cross-carrier CSI reporting for sidelink according to operations 800 of FIG. 8 and/or operations 900 of FIG. 9. Wireless communication network 100 includes a SL component 199, which may configure a network entity (e.g., a base station, such as a gNB) to perform operations for (guiding) cross-carrier CSI reporting for sidelink according to operations 1000 of FIG. 10.

Figure 2:
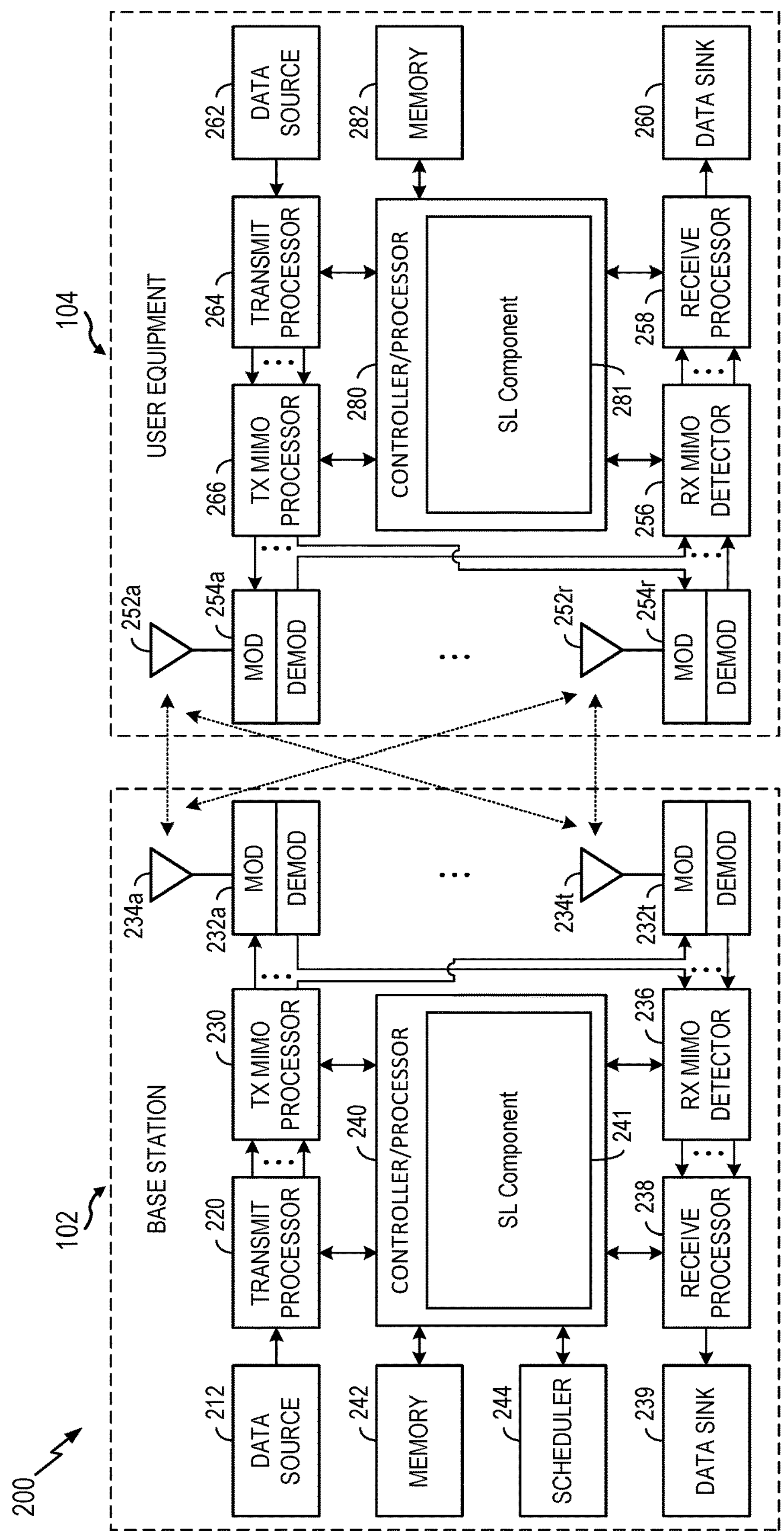
FIG. 2 is a block diagram conceptually illustrating aspects of an example base station and user equipment.

FIG. 2 depicts aspects of an example base station (BS) 102 and a user equipment (UE) 104.

Generally, base station 102 includes various processors (e.g., 220, 230, 238, and 240), antennas 234*a-t* (collectively antennas 234), transceivers 232*a-t* (collectively transceivers 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes a SL component 241, which may be representative of SL component 199 of FIG. 1. Notably, while depicted as an aspect of controller/processor 240, a SL component 241 may be implemented additionally or alternatively in various other aspects of base station 102 in other implementations.

Generally, user equipment 104 includes various processors (e.g., 258, 264, 266, and 280), antennas 252*a-r* (collectively antennas 252), transceivers 254*a-r* (collectively transceivers 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes SL component 281, which may be representative of SL component 198 of FIG. 1. Notably, while depicted as an aspect of controller/processor 280, SL component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe. In some aspects, UEs may be configured to communicate (e.g., via SL communications) using the frame format described with respect to diagrams 300, 330, 350, 380. A radio frame (e.g., as shown in diagram 300) may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS, during which SL communication may occur. Further discussions regarding FIG. 1, FIG. 2, and FIGS. 3A-3D are provided later in this disclosure.

Introduction to Sidelink

Figures 3E, 3F:
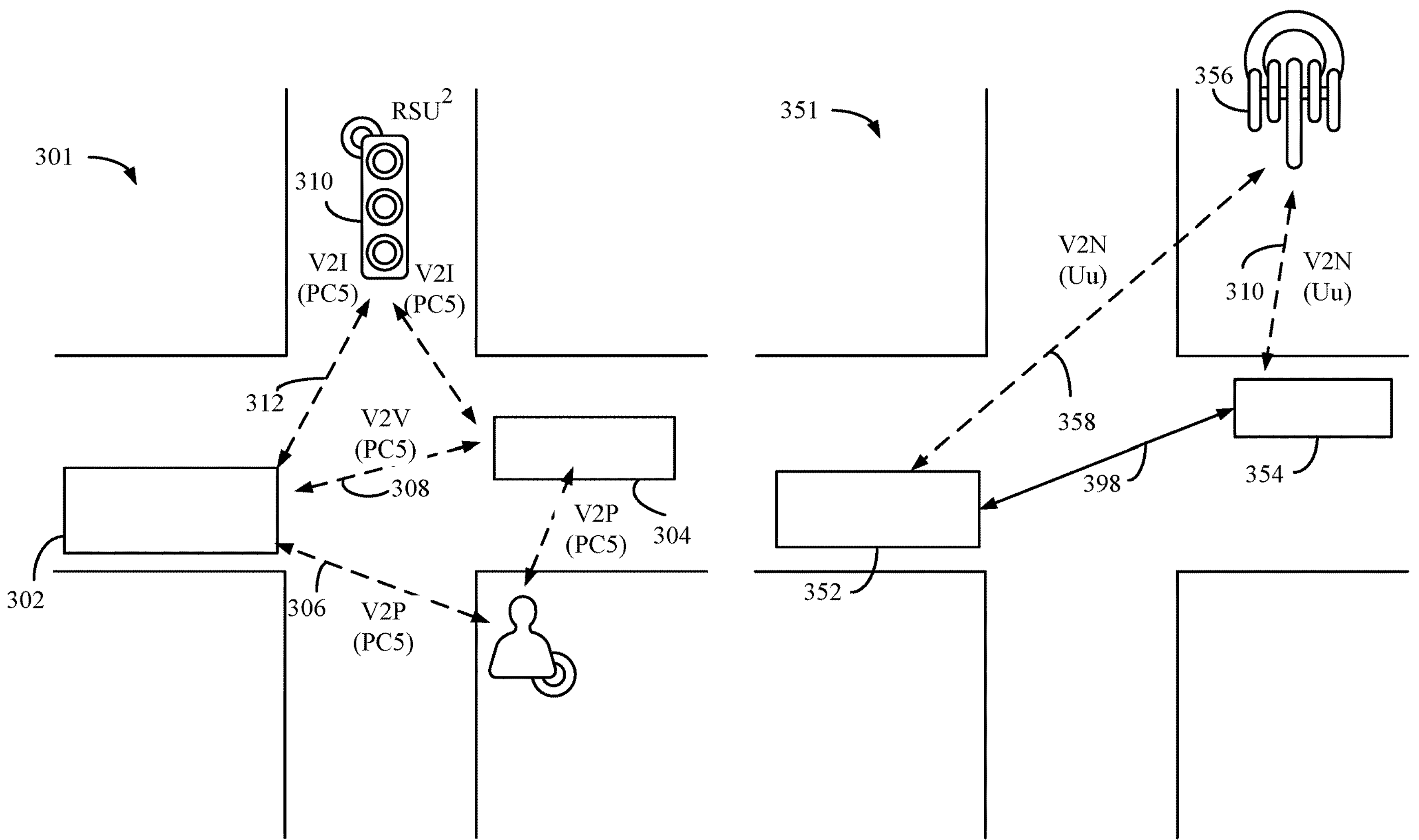
FIGS. 3E-3F depict various example sidelink communication scenarios.

FIGS. 3E and 3F show diagrammatic representations of example vehicle to everything (V2X) systems in accordance with some aspects of the present disclosure. For example, the UEs shown in FIGS. 3E and 3F may communicate via sidelink channels and may perform sidelink CSI reporting as described herein.

The V2X systems, provided in FIGS. 3E and 3F provide two complementary transmission modes. A first transmission mode, shown by way of example in FIG. 3E, involves direct communications (for example, also referred to as side link communications) between participants in proximity to one another in a local area. A second transmission mode, shown by way of example in FIG. 3F, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3E, a V2X system 301 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3E, two-way communication may take place between elements, therefore each element may be a transmitter and a receiver of information. The V2X system 301 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3F shows a V2X system 351 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed or unlicensed spectrum or a combination of both licensed and unlicensed spectrums.

Various sidelink channels may be used for sidelink communications, including, a physical sidelink control channel (PSCCH), a physical sidelink shared channel (PSSCH), and a physical sidelink feedback channel (PSFCH). The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Protocol Stack

Figure 4:
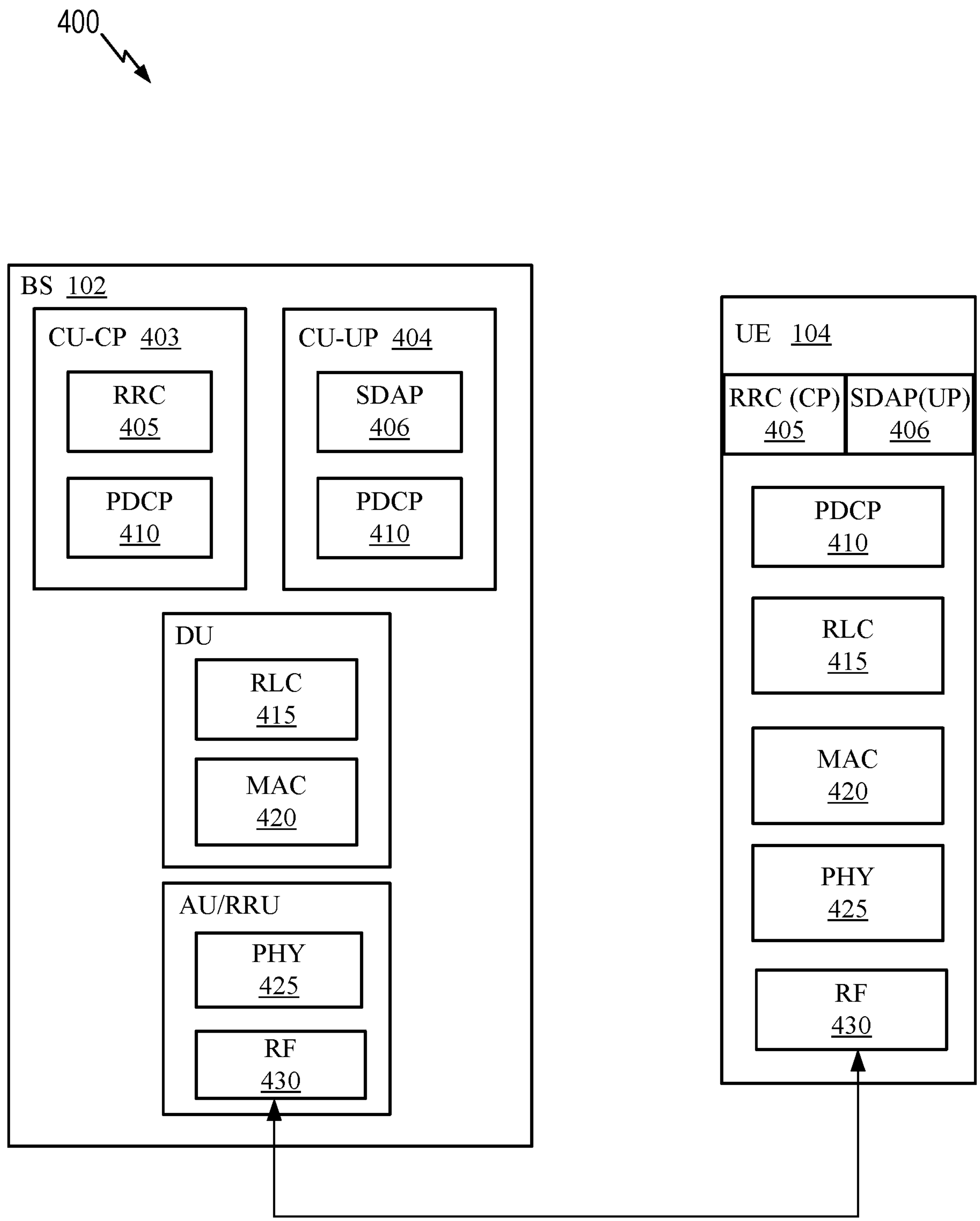
FIG. 4 illustrates a diagram showing examples for implementing a communications protocol stack in a radio access network (RAN), in accordance with certain aspects of the present disclosure.

FIG. 4 is a diagram showing examples for implementing a communications protocol stack 400 in a radio access network (RAN), according to aspects of the present disclosure. The illustrated communications protocol stack 400 may be implemented by devices operating in a wireless communication system, such as a 5G NR system (e.g., the wireless communication network 100 of FIG. 1). In various examples, the layers of the protocol stack 400 may be implemented as separate modules of software, portions of a processor or application-specific integrated circuit (ASIC), portions of non-collocated devices connected by a communications link, or various combinations thereof. Collocated and non-collocated implementations may be used, for example, in a protocol stack for a network access device or a UE. As shown in FIG. 4, the system may support various services over one or more protocols. One or more protocol layers of the protocol stack 400 may be implemented by the BS 102 and/or a UE 104.

As shown in FIG. 4, the protocol stack 400 is split in the BS 102. The radio resource control (RRC) layer 405, service data adaptation protocol (SDAP) layer 406, packet data convergence protocol (PDCP) layer 410, radio link control (RLC) layer 415, media access control (MAC) layer 420, physical (PHY) layer 425, and radio frequency (RF) layer 430 may be implemented by the BS 102. For example, a central unit-control plane (CU-CP) 403 and a central unit-user plane (CU-UP) 404 each may implement the RRC layer 405 or SDAP layer 406 respectively and the PDCP layer 410. A distributed unit (DU) may implement the RLC layer 415 and MAC layer 420. The Antenna/Remote Radio Units (AU/RRU) may implement the PHY layer(s) 425 and the RF layer(s) 430. The PHY layers 425 may include a high PHY layer and a low PHY layer. The UE 104 may implement the entire protocol stack 400 (e.g., the RRC layer 405 for control plane, the SDAP layer 406 for user plane, the PDCP layer 410, the RLC layer 415, the MAC layer 420, the PHY layer(s) 425, and the RF layer(s) 430).

Introduction on Carrier Aggregation on Sidelink

Figure 5:
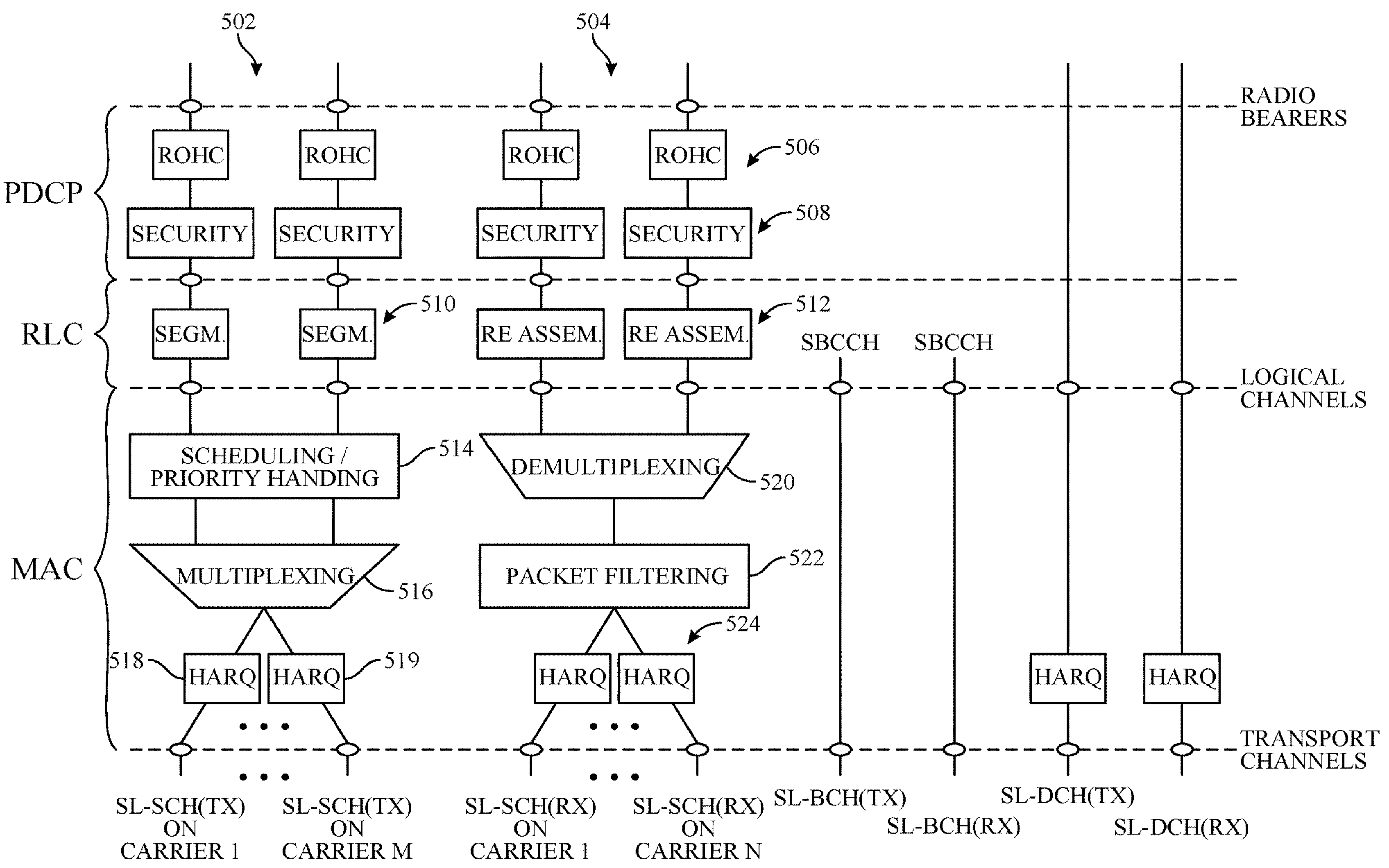
FIG. 5 is a block diagram that illustrates techniques for implementing carrier aggregation (CA) in multiple layers of a protocol stack, in accordance with certain aspects of the present disclosure.

FIG. 5 is a block diagram that illustrates techniques for implementing carrier aggregation (CA) which may be supported in some V2X deployments (e.g., LTE V2X), but not others (e.g., NR V2X). As shown, a packet data convergence protocol (PDCP) layer (e.g., corresponding to the PDCP layer 410 of FIG. 4) for a protocol stack 502 (e.g., for transmission) may include robust header compression (ROHC) components 506 and security components 508. As illustrated, a radio link control (RLC) layer (e.g., corresponding to the RLC layer 415 of FIG. 4) of the protocol stack 502 may include segmentation components 510. Further, a media access control (MAC) layer (e.g., corresponding to the MAC layer 420 of FIG. 4) of the protocol stack 502 may include a schedule/priority handling component 514, a multiplexer 516, and hybrid automatic repeat request (HARQ) components 518, 519. A protocol stack may include a HARQ component for each carrier configured for signal transmission (e.g., M carriers, where M is a positive integer). The scheduling/priority handling component 514 may schedule packets for transmission on the carriers. For example, the scheduling/priority handling component 514 may generate a RLC protocol data unit (PDU), which may be provided to the multiplexer 516 for generating a MAC PDU. HARQ components 518, 519 may generate transport blocks (TBs) based on the MAC PDU for transmission on the carriers. For example, multiple HARQ components (e.g., HARQ components 518, 519) may be used to implement carrier aggregation (CA) on two carriers to transmit TBs. That is, multiple TBs may be transmitted on different carriers to increase throughput gain. There may be one independent HARQ component per carrier used for V2X SL communication and each TB and its potential HARQ retransmissions may be mapped to a single carrier, in some implementations.

As illustrated, a protocol stack 504 may be implemented for reception which may include a MAC layer having HARQ components 524, a packet filtering component 522, and a demultiplexing component 520 used to process received TBs. The protocol stack 504 may include a HARQ component 524 for each carrier (e.g., N carriers, where N is a positive integer). As shown, the protocol stack 504 may include an RLC layer having reassembly components 512 and a PDCP layer having security components 508 and ROHC components 506.

In some deployments, such as LTE V2X, SL CA with resource allocation may be implemented with a BS transmitting downlink control information (DCI) having a carrier indication field (CIF) to indicate a carrier to be used for SL. In some implementations, SL CA may use a sensing procedure to select resources independently on each involved carrier. The same carrier may be used for all TBs of the same SL process at least until another resource re-selection is triggered.

Sidelink Cross-Carrier CSI Reporting

As described above with reference to FIG. 5, one independent HARQ entity per carrier is typically used for V2X sidelink communication and each TB (and its potential HARQ retransmissions) are typically mapped to a single carrier. This allows multiple TBs to be transmitted in parallel on different carriers for a throughput gain.

Sidelink CA in certain resource allocation modes (e.g., resource allocation mode 3 with LTE V2X) using a dynamic grant may be considered as similar to resource allocation on the Uu (cellular) interface, by the use of a carrier indication field (CIF) in the DCI from the eNB. Sidelink CA in other resource allocation modes (e.g., resource allocation mode 4 with LTE V2X) uses a sensing procedure to select resources independently on each involved carrier. The same carrier is used for all transport blocks of the same sidelink process at least until the process triggers resource re-selection. Conventionally, there is no CSI reporting in LTE V2X and Carrier Aggregation is not conventionally supported in NR V2X.

Figure 6:
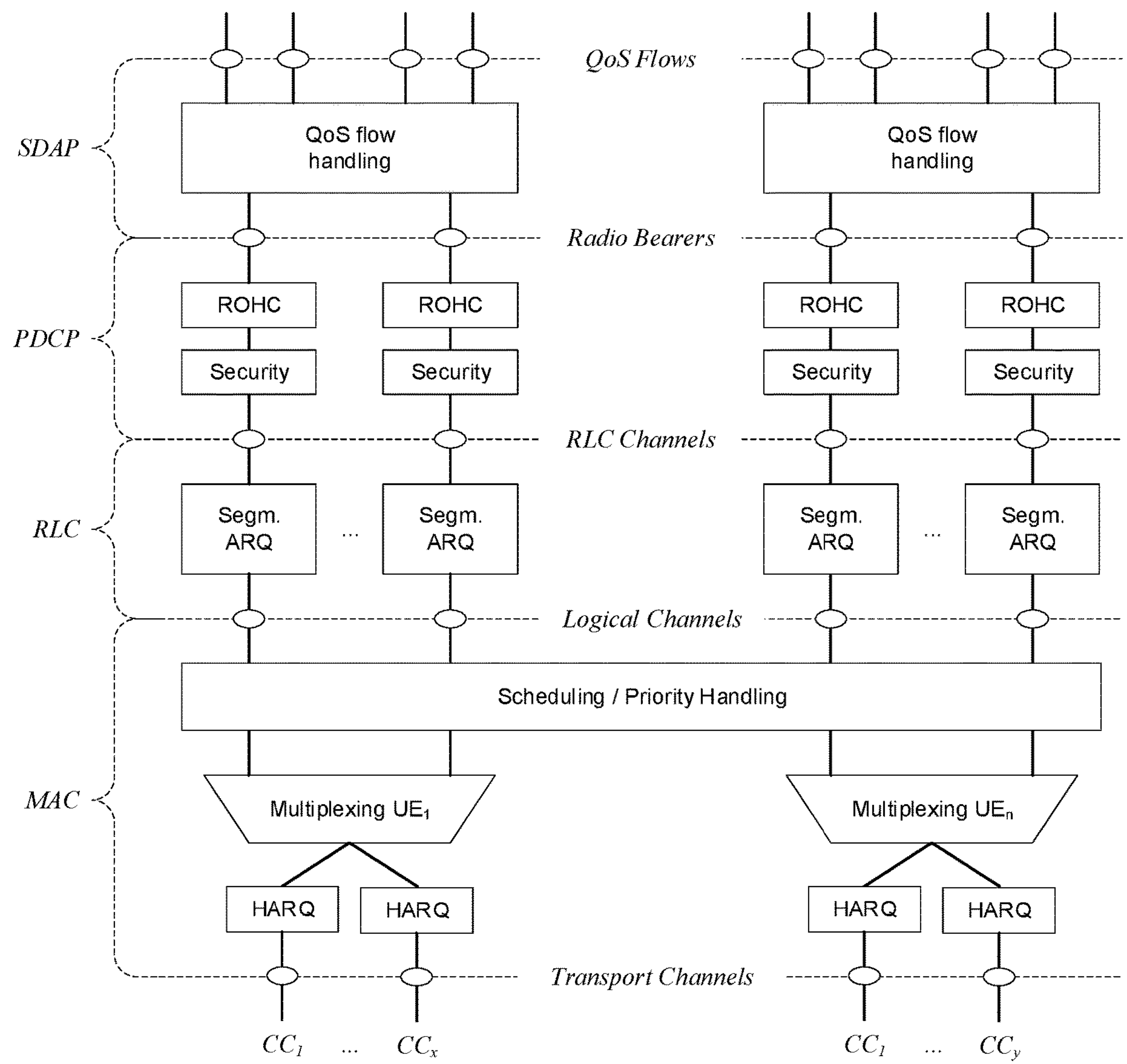
FIGS. 6 and 7 are block diagrams illustrating techniques for implementing CA, in accordance with certain aspects of the present disclosure.
Figure 7:
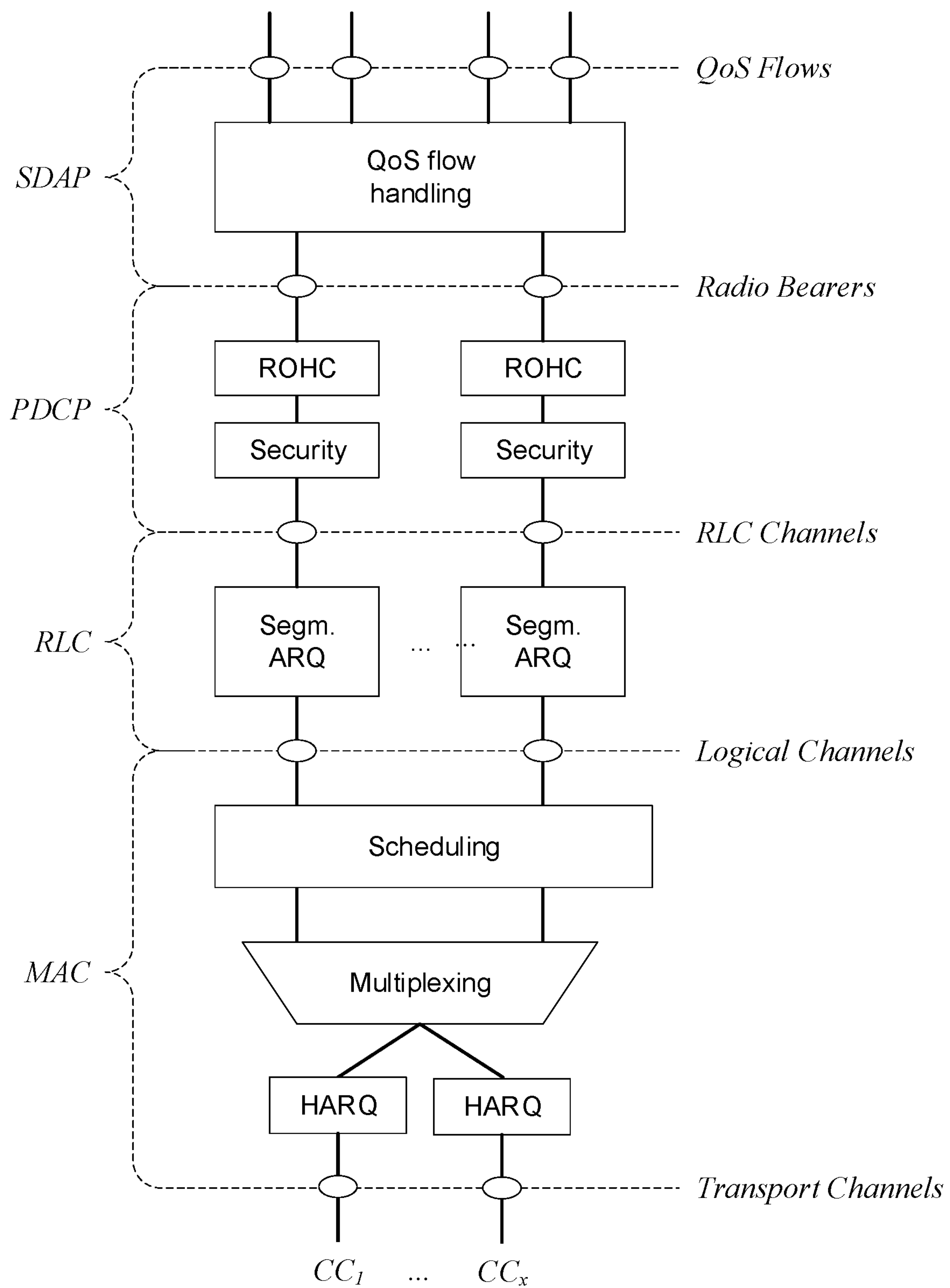

In the case of CA, the multi-carrier nature of the physical layer is typically only exposed to the MAC layer for which one HARQ entity is typically required per serving cell, as depicted in FIGS. 6 and 7. FIG. 6 illustrates the multi-carrier nature of CA multiplexing of multiple UEs ($UE_1 \ldots UE_n$) for downlink on Uu interface, while FIG. 7 illustrates the multi-carrier nature of CA for a single UE for uplink on Uu interface.

As illustrated, in both uplink and downlink, there is typically one independent hybrid-ARQ entity per serving cell and one transport block is generated per assignment/grant per serving cell in the absence of spatial multiplexing. Each TB and its potential HARQ retransmissions are mapped to a single serving cell. Cross-carrier scheduling and feedback may be supported, for example, where a primary cell (Pcell) schedules a DL transmission on a secondary cell (Scell) and receives either HARQ feedback or CSI report, where the scheduling DCI on PDCCH and feedback(s) on PUCCH or PUSCH are carried on the Pcell's carrier and the DL transmission on PDSCH is carried on the Scell's carrier.

For sidelink communications, Asynchronous Channel State Information (C SI) reporting may be supported for each set of paired UEs with a PC5 RRC connection (for sidelink unicast) for both Mode 1 and Mode 2 resource allocation in NR V2X. This asynchronous CSI reporting may be triggered by one of the paired UEs that sends a sidelink control information message (e.g., a SCI 2 with data) to the other UE with a CSI request field set to "1". The CSI may be reported by the other UE via a MAC CE.

This type of CSI reporting may be constrained by a latency requirement for a CSI triggering UE via CSI report timer sl-CSI-ReportTimer. With the development of more dynamic carrier aggregation (e.g., with carriers operating at FR2 or mmWave where the channel is more dynamic with deep attenuation and severe blocking or carriers operating at unlicensed spectrum where the channel is more opportunistic than deterministic), a CSI report may not be received due to blocking or unavailable channel. This may potentially cause performance degradation for unicast transmissions between UEs.

Aspects of the present disclosure, however, provide cross-carrier CSI reporting mechanisms that may help to ensure reliable and timely CSI feedback based on channel status. This enhanced CSI reporting may be important to help meet more stringent reliability and latency requirements for supporting advanced V2X services.

The CSI reporting mechanisms proposed herein may be used for Intra-band (component carriers within a same frequency band, e.g., carriers in FR2 or FR4 band or carriers in unlicensed band) or Inter-band (component carriers in different frequency bands, e.g., carriers in FR1 and FR2 or FR4 band or carriers in licensed and unlicensed band) sidelink Carrier Aggregation (CA).

The CSI reporting mechanisms proposed herein may be referred to as cross-carrier because one or more CSI reports may be transmitted or aggregated on one or more component carriers which are different from the component carriers on which the CSI requests are received. The CSI reports may be conveyed via multiple CSI MAC CEs corresponding to multiple CSI requests respectively or a single CSI MAC CE may aggregate multiple CSI reports corresponding to multiple CSI requests.

FIGS. 8 and 9 are flow diagrams illustrating operations 800 and 900 from the perspective of a cross-carrier CSI triggering UE and CSI reporting UE, respectively.

Referring first to FIG. 8, the operations 800 may be performed, for example, by a first UE (e.g., the UE 120*a* in the wireless communication network 100) to trigger a cross-carrier CSI report by a second UE. The operations 800 may be implemented as software components that are executed and run on one or more processors (e.g., controller/processor 240 of FIG. 2). Further, the transmission and reception of signals by the UE in operations 800 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 800 begin, at 810, by transmitting, to a second UE, one or more channel state information (CSI) requests on one or more first component carriers (CCs) via one or more sidelink control informations (SCIs) that includes a CSI request flag. For example, the first UE may send one or more SCI-2*s* with a CSI request field set to "1". SCI-2 generally refers to a second stage SCI in a deployment (e.g., NR V2X) that utilizes 2-stage SCI. Splitting SCI into two stages ($1^{st}$-stage SCI or SCI-1 and $2^{nd}$-stage SCI or SCI-2) has an advantage of single stage that it allows UEs that are not intended recipients to decode only SCI-1 for channel sensing purposes (e.g., for determining resources reserved for other transmissions), while SCI-2 provides additional control information used by the intended recipients.

At 820, the UE, receives, in response to the one or more CSI requests, one or more CSI reports from the second UE on one or more second CCs. As will be described in greater detail below, the CSI reports may be sent in separate MAC CEs or aggregated in a single MAC CE.

FIG. 9 is a flow diagram illustrating example operations 900 that may be considered complementary to operations 800 of FIG. 8. For example, operations 900 may be performed by a second UE to send a cross-carrier CSI report to a first UE performing operations 800 of FIG. 8. The operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 begin, at 910, by receiving, from a first UE, one or more channel state information (CSI) requests on one or more first component carriers (CCs) via one or more sidelink control informations (SCIs) that includes a CSI request flag. At 920, the second UE transmits, in response to the one or more CSI requests, one or more CSI reports to the first UE on one or more second CCs.

In some cases, an entity other than the paired UEs may guide (or manage) the cross-carrier CSI reporting. For example, a gNB or a roadside unit (RSU) or lead UE (e.g., of a platoon of UEs) may manage cross-carrier CSI reporting.

Figure 10:
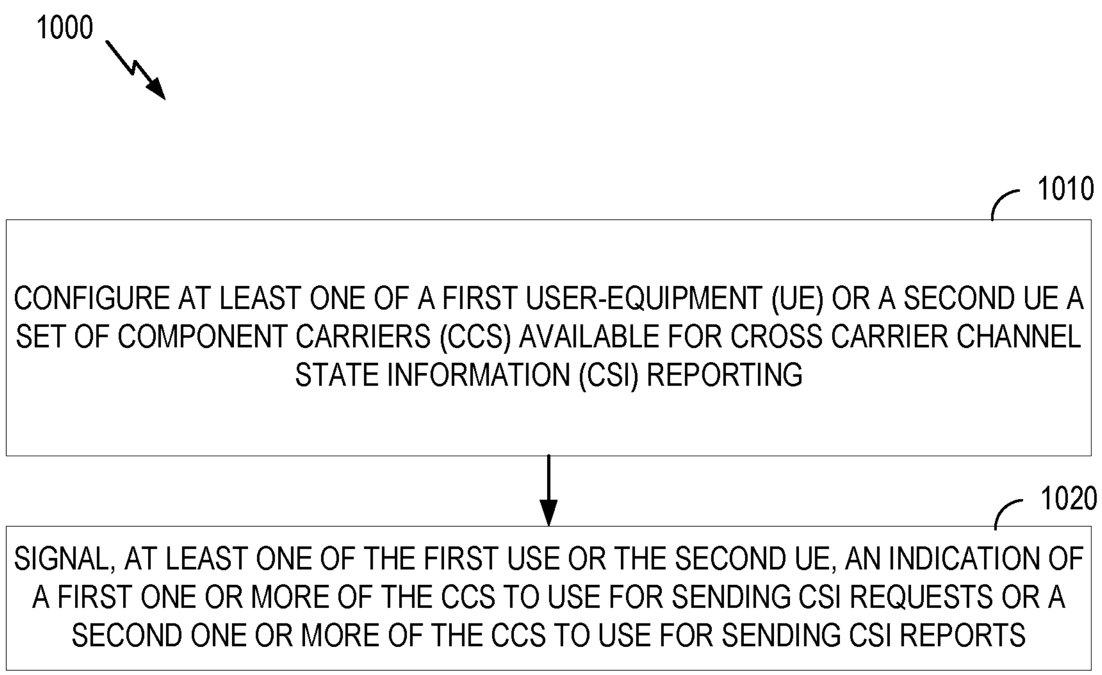
FIG. 10 is a flow diagram illustrating example operations for wireless communication by a network entity, in accordance with certain aspects of the present disclosure.

FIG. 10 is a flow diagram illustrating example operations 1000 that may be performed by such an entity to guide cross-carrier CSI reporting. The operations 1000 may be implemented as software components that are executed and run on one or more processors (e.g., controller/processor 240 or 280 of FIG. 2). Further, the transmission and reception of signals by the UE in operations 1000 may be enabled, for example, by one or more antennas (e.g., antennas 252 of FIG. 2). In certain aspects, the transmission and/or reception of signals by the entity may be implemented via a bus interface of one or more processors (e.g., controller/processor 240/280) obtaining and/or outputting signals.

The operations 1000 begin, at 1010, by configuring at least one of a first user-equipment (UE) or a second UE a set of component carriers (CCs) available for cross carrier channel state information (CSI) reporting. At 1020, the entity signals, at least one of the first UE or the second UE, an indication of a first one or more of the CCs to use for sending CSI requests or a second one or more of the CCs to use for sending CSI reports.

Figure 11:
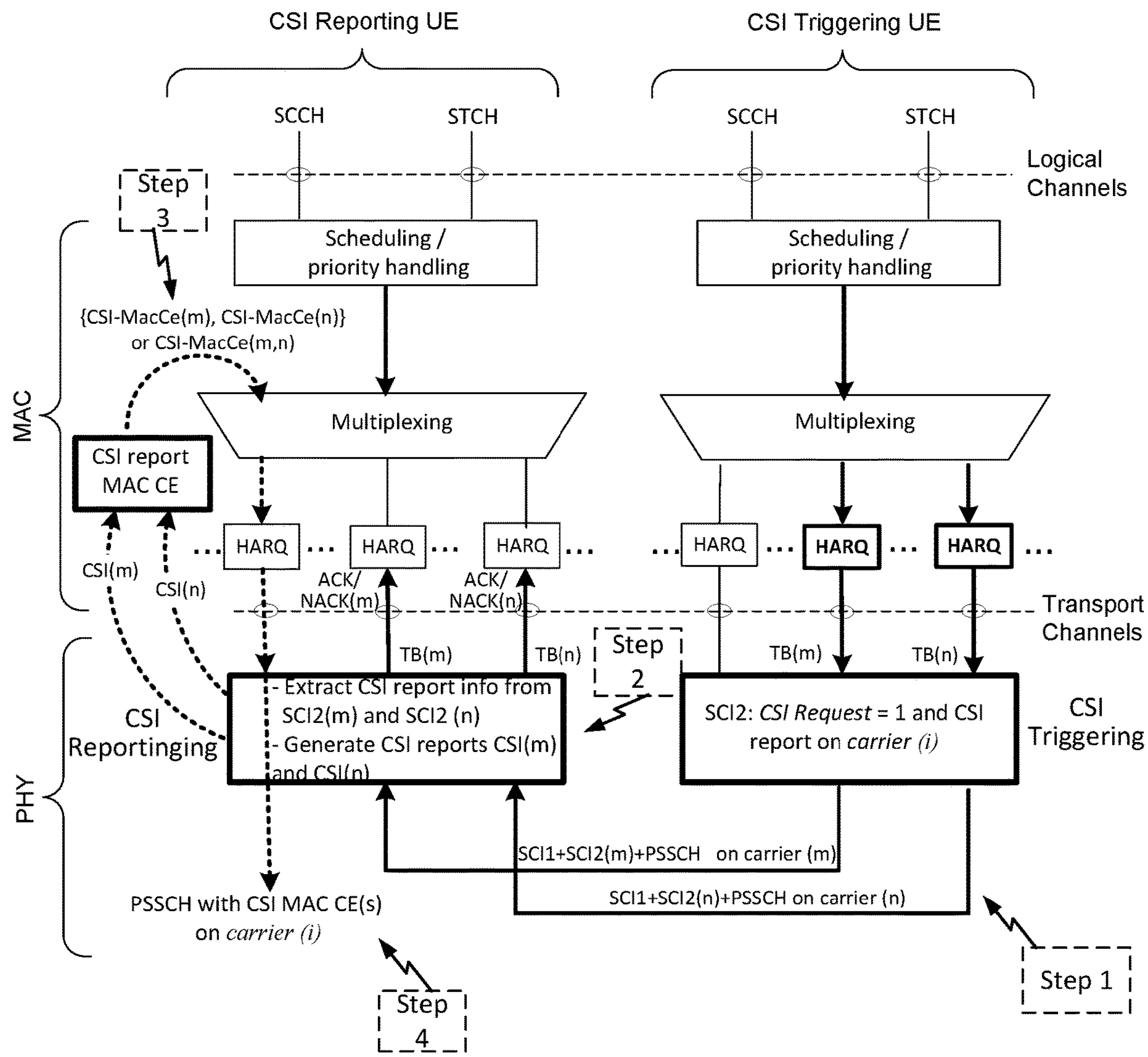
FIG. 11 illustrates an example of cross-carrier CSI reporting for sidelink, in accordance with certain aspects of the present disclosure.

Cross-carrier CSI-reporting in accordance with certain aspects of the present disclosure may be understood with reference to the diagram shown in FIG. 11. The diagram illustrates a sequence of operations performed at a CSI triggering UE (e.g., performing operations 800 of FIG. 8) and a CSI reporting UE (e.g., performing operations 900 of FIG. 9).

As illustrated in FIG. 11, as a first step (step 1), the CSI triggering UE triggers CSI reports by sending SCI2s, each containing a CSI request field/flag set to "1" on the component carrier(s) pre-configured or configured or activated for sidelink CA. The SCI2 may also indicate, via a CSI Carrier Index for the carrier to be used for transmitting the corresponding CSI report (e.g., Carrier (i) for sidelink cross carrier CSI report). Each SCI may be transmitted with a transport block (TB) in a given carrier for sidelink CA. For example, SCI2(m) may be sent with TB(m) in a PSSCH on carrier(m) and SCI2(n) may be sent with TB(n) in a PSSCH on carrier(n).

In some cases, the carrier i for transmitting CSI report may be configured (or pre-configured). For example, for inter-band SL CA, an FR1 carrier may be configured to carry the CSI report for FR1 and FR2 carrier aggregation (in order to increase reliability). Similarly, a licensed carrier may be configured to carry the CSI report for CA involving licensed and unlicensed carriers. In some cases, the carrier i may be semi-statically selected and activated, for example, by a base station via Uu interface or by a special UE (e.g., an RSU or a lead UE or a scheduling UE), a CSI triggering UE, or CSI reporting UE via PC5 interface. In some cases, the carrier i may be dynamically selected and indicated in SCI 2, for example, by a scheduling UE, a CSI triggering UE.

At a second step (step 2), the CSI reporting UE extracts the CSI report information from each of the received SCI2*s*. Based on the extracted information, the CSI reporting UE generates a CSI report for each CSI request (e.g., CSI(m) on carrier m and CSI(n) on carrier n).

At a third step (step 3) the CSI reporting UE generates (composes) one or more CSI report MAC CEs for the CSI requests for CSI(m) and CSI(n). In some cases, multiple CSI report MAC CEs may be generated for the corresponding CSI requests on multiple carriers, for example, CSI MAC CE(m) for CSI request CSI(m) and CSI MAC CE(n) for CSI request CSI(n). In other cases, a single CSI report MAC CE may aggregate multiple CSI reports, for example, with multiple CSI report fields for the CSI requests on multiple carriers for sidelink CA.

At a fourth step (step 4), the CSI reporting UE multiplexes the CSI report MAC CE (or MAC CEs) with other logic channels in a PSSCH transmission on carrier (i) as illustrated in FIG. 11.

At a high level, preparation for cross-carrier CSI reporting may involve two general stages: Configuring (or pre-configuring) the component carriers available for cross-carrier CSI reporting; Selecting (or activating) one or more of the configured component carriers.

Figure 12:
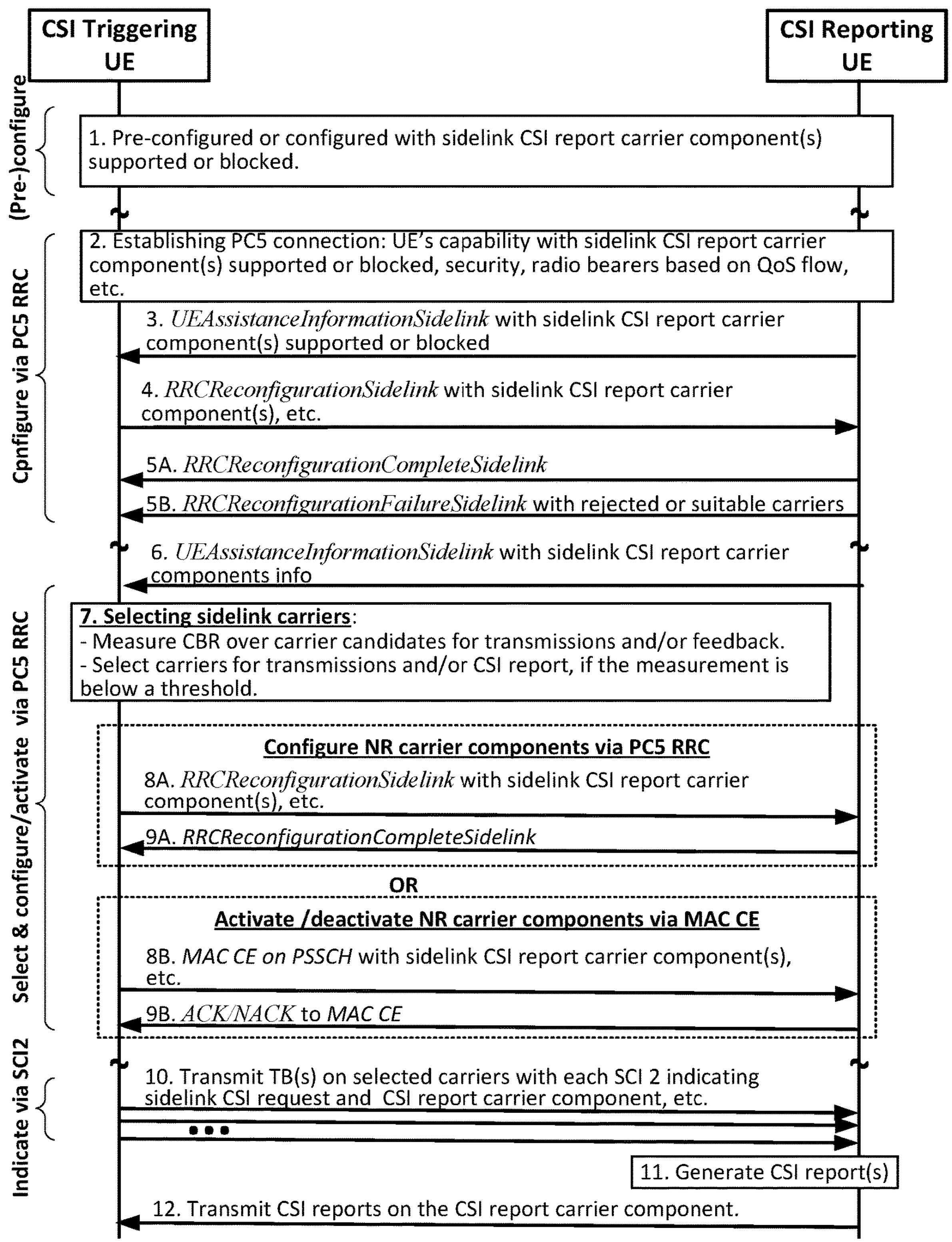
FIGS. 12-13 are call flow diagrams illustrating examples of cross-carrier CSI reporting for sidelink, in accordance with certain aspects of the present disclosure.

Example details of these different stages are shown in the call flow diagram of FIG. 12. In the configuration stage, UEs may be pre-configured or configured via the network (at step 1) while the UEs are under network's coverage, based on service(s), with sidelink CA enabled (e.g., SL-NR-CA), with sidelink component carrier(s) for CSI reporting (e.g., indicated via an SL-NR-CA-carrier-CSI-list), sidelink component carriers supported or blocked for sidelink CA with CSI request (e.g., via an SL-NR-CA-carrier-list or SL-NR-CA -carrier-combined-list for sidelink CA with CSI request, SL-NR-CA-carrier-block-list or SL-NR-CA-carrier-combined-block-list blocked for sidelink CA with CSI request).

As an alternative, or in addition to network configuration, sidelink CSI report component carriers may be configured via PC5 RRC.

In this case, at step 2, during PC5 connection establishment between two UEs (e.g., a CSI triggering UE and a CSI reporting UE) , information may be exchanged via UE's capability message with sidelink component carriers information for CSI reporting (e.g., indicated via an SL-NR-CA-carrier-CSI-ue-list) and/or sidelink component carriers supported or blocked for sidelink CA with CSI request (e.g., via an SL-NR-CA-carrier-ue-list or SL-NR-CA-carrier-combined-ue-list, SL-NR-CA-carrier-block-ue-list or SL-NR-CA-carrier-combined-block-ue-list), security, and/or radio bearers based on Quality of Service (QoS) flow.

As an alternative, or in addition, at step 3, the CSI reporting UE may send a UEAssistanceInformationSidelink message with sidelink component carriers information for CSI reporting (e.g., indicated via an SL-NR-CA-carrier-CSI-ue-list) and/or sidelink component carriers information for sidelink CA with CSI request (e.g., via an SL-NR-CA-carrier-ue-list or SL-NR-CA-carrier-combined-ue-list, SL-NR-CA-carrier-block-ue-list or SL-NR-CA -carrier-combined-block-ue-list).

At step 4, the CSI triggering UE may determine sidelink component carriers for sidelink CA with CSI request (e.g., SL-NR-CA-carrier-list-1) and/or sidelink CSI report component carrier(s) (e.g., SL-NR-CA-carrier-CSI-list-1) based on the sidelink component carrier information received via CSI reporting UE's UE Capability message (e.g., at step 2) or CSI reporting UE's UE assistance information message (e.g., at step 3), and then send an RRCReconfigurationSidelink message with determined sidelink component carriers (e.g., SL-NR-CA-carrier-list1) and/or sidelink CSI report component carrier(s) (e.g., SL-NR-CA-carrier-CSI-listl). The CSI reporting UE may respond, for example, with an RRCReconfigurationCompleteSidelink message to indicate acceptance (step 5A), or with an RRCReconfigurationFailureSidelink message (step 5B) with rejected component carrier(s) (e.g., SL-NR-CA-carrier-block-list2 and/or SL-NR-CA-carrier-CSI-block-list2) or suitable component carrier(s) (e.g., SL-NR-CA-carrier-list2 and/or SL-NR-CA-carrier-CSI-list2). In this case, the CSI triggering UE may send another RRCReconfigurationSidelink message with sidelink component carriers updated (e.g., SL-NR-CA-carrier-list3 and/or SL-NR-CA-carrier-CSI-list3) based on CSI reporting UE's rejection and the CSI reporting UE may accept the updated configuration via another RRCReconfiguration-CompleteSidelink message. At this point, the configuration stage may be considered complete, as both the CSI Triggering UE and CSI Reporting UE are configured with component carriers for SL CA and cross-carrier SL CSI reporting.

As an alternative, or in addition, sidelink CA component carriers and/or sidelink CSI report component carriers may be selected and then configured via PC5 RRC or activated via PC5 MAC CE.

In this case, at step 6, the CSI reporting UE (or CSI triggering UE though not shown in FIG. 12) may send a UEAssistanceInformationSidelink message with sidelink CA component carriers and/or sidelink CSI report component carriers information (e.g., SL-NR-CA-carrier-list4 and/or SL-NR-CA-carrier-CSI-list4).

At step 7, the CSI triggering UE (or CSI reporting UE though not shown in FIG. 12) selects the sidelink carriers for sidelink CA and/or for cross-carrier CSI reporting (e.g., SL-NR-CA-carrier-list5 and/or SL NR-CA-carrier-CSI-lists) taking CSI reporting UE's assistance information into consideration for the carrier selection. In some cases, the selection may be based on metrics, such as measured channel busy ratio (CBR) or reference signal received power (RSPS) or received signal strength indicator (RSSI) over (the pre-configured or configured or received via UE's capability message or received via UE's assistance information message) carrier candidates (e.g., pre-configured or configured SL-NR-CA-carrier-list and/or SL-NR-CA-carrier-CSI-list, or CSI reporting UE's SL-NR-CA-carrier-ue-list and/or SL-NR-CA-carrier-CSI-ue-list) for transmissions and/or feedback respectively. In some cases, carriers may be selected for transmissions and/or CSI report, if the measured metric is above or below a threshold (e.g., depending on the metric). For example, CBR or RSRP or RSSI below a threshold for a given carrier may prompt sidelink CA with CSI request or sidelink CSI report using that carrier.

In some cases, selected NR component carriers for sidelink CA with CSI request and/or sidelink CSI report may be configured via PC5 RRC, at step 8A, the CSI triggering UE (or CSI reporting UE though not shown in FIG. 12) may send an RRCReconfigurationSidelink message with information, such as sidelink CA component carriers and sidelink CSI report component carrier(s) (e.g., SL-NR-CA-carrier-list6 and/or SL-NR-CA-carrier-CSI-list6). The CSI reporting UE (or CSI triggering UE though not shown in FIG. 12) may respond with an RRCReconfigurationCompleteSidelink message to indicate acceptance.

In other cases, NR component carriers may be activated or deactivated via PC5 MAC CE. For example, at step 8B, the CSI triggering UE (or CSI reporting UE though not shown in FIG. 12) may send a PC5 MAC CE activating sidelink CA with CSI request component carriers and/or sidelink CSI report component carrier(s) (e.g., SL-NR-CA-carrier-list6 and/or SL-NR-CA-carrier-CSI-list6). At step 9B, the CSI reporting UE (or CSI triggering UE though not shown in FIG. 12) may respond with an ACK/NACK for the PC5 MAC CE to indicate acceptance.

As an alternative, or in addition, when triggering the cross-carrier CSI report, the sidelink component carrier(s) for feedback (e.g., one or more component carriers indicated in SL-NR-CA-carrier-CSI-list7) may be indicated via SCI2. For example, at step 10, the CSI triggering UE may transmit TB(s) on selected carriers (e.g., SL-NR-CA-carrier-list6, with each corresponding SCI 2 indicating sidelink CSI report component carrier(s) (e.g., SL-NR-CA-carrier-CSI-list7).

At step 11, the CSI reporting UE generates sidelink CSI reports per the received CSI requests and, at step 12, the CSI reporting UE sends sidelink CSI report MAC CE(s) on the indicated CSI report carrier(s) (e.g., one or more component carriers indicated in SL-NR-CA-carrier-CSI-list7).

For the cases or alternatives described for FIG. 12, the messages or control signals exchanged between CSI triggering UE and CSI reporting UE may be carried on a carrier pre-configured, configured, or selected and activated for PC5 control plane.

Figure 13:
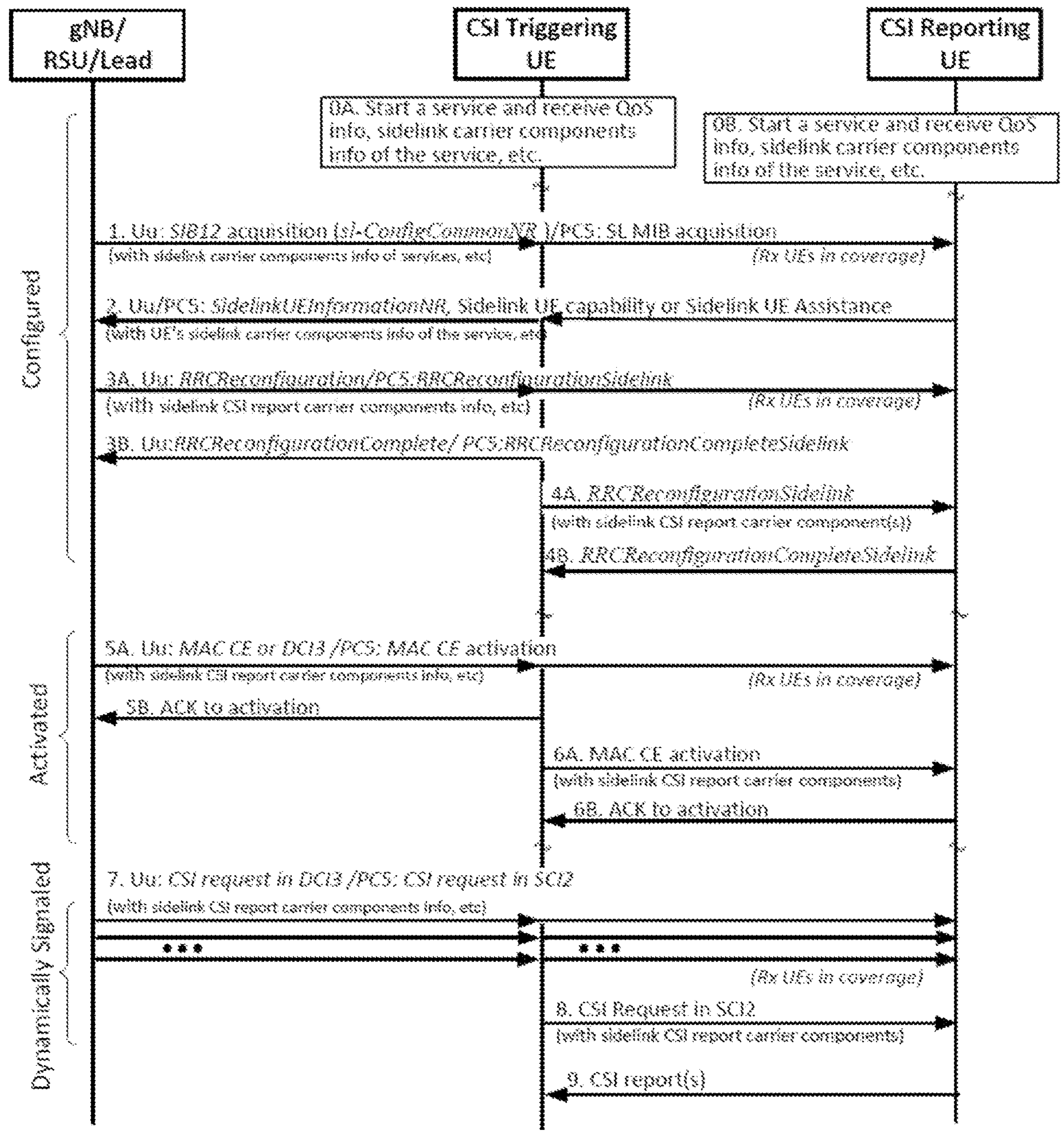

As noted above, in some cases a third entity (separate from the CSI Triggering and CSI Reporting UEs) may help guide or manage sidelink CA with CSI request component carriers and/or sidelink cross-carrier CSI reporting component carriers. For example, as illustrated in FIG. 13, a gNB, roadside unit (RSU) or lead UE (such as platoon lead) or scheduling UE may manage sidelink CA component carriers and/or sidelink cross-carrier CSI-reporting component carriers, by taking part in one of the configuring, selecting/activation, or triggering stages described above.

As illustrated (as steps OA and OB), the managing entity, CSI Triggering and reporting UEs may start a service and receive corresponding information, such as QoS information and sidelink component carriers information associated with the service.

To configure component carriers for cross-carrier CSI reporting, at step 1, the CSI Triggering and Reporting UEs may perform (on the Uu/cellular link) SIB12 acquisition information (e.g., SL-ConfigCommonNR) from the gNB or SL MIB or SL SI acquisition (on a PC5 link) from an RSU or Lead UE, for sidelink component carriers information of services. If no sidelink component carriers information is acquired at step 1, at step 2, the CSI triggering UE (or CSI reporting UE) sends Sidelink UE Information, Sidelink UE capability information, and/or Sidelink UE Assistance information with the UE's sidelink component carriers information of the service, CSI report component carriers information, and the like. If either CSI triggering UE or CSI reporting UE is out of the gNB or RSU or Lead UE's coverage (herein as out of coverage UE), the other UE may forward the sidelink CA with CSI request component carriers information and/or sidelink CSI report component carriers information, received from the out of coverage UE on sidelink, to gNB (on Uu interface) or RSU or Lead UE (on PC5 interface).

At step 3A, the managing entity sends an RRC reconfiguration message with sidelink CA with CSI request component carrier information and/or sidelink CSI report component carrier information. For example, a gNB via Uu interface sends an RRCReconfiguration message or an RSU or Lead UE via PC5 interface sends an RRCReconfigurationSidelink message. At step 3B, the CSI triggering UE (or CSI reporting UE) sends an RRC Reconfiguration Complete message to indicate acceptance (e.g., an RCReconfigurationComplete message to a gNB on Uu interface or RCReconfigurationCompleteSidelink to RSU or Lead UE on PC5 interface). At step 4A, the CSI triggering UE (or CSI reporting UE) forwards the sidelink CA with CSI request component carriers information and/or sidelink CSI report component carriers information (e.g., via an RRCReconfigurationSidelink message with sidelink CA with CSI request component carriers information and/or sidelink CSI report component carriers information, if needed (e.g., if only one of the CSI Triggering UE or CSI Reporting UE is in communication with the managing entity). At step 4B, the CSI reporting UE (or CSI triggering UE) responds with an RRCReconfigurationCompleteSidelink message to indicate acceptance.

As an alternative, or in addition, to activate sidelink CA with CSI request component carriers and/or sidelink component carriers for cross-carrier CSI reporting, at step 5A, the managing entity may send a MAC CE or DCI. For example, a gNB may send a MAC CE or DCI3 via Uu interface or an RSU or lead UE or a scheduling UE may send a PC5 MAC CE via PC5 interface to activate sidelink CA component carriers and/or sidelink CSI report component carriers. At step 5B, the CSI reporting UE (or CSI triggering UE) sends ACKs for the PC5 MAC CE to indicate acceptance.

At step 6A, the CSI triggering UE (or CSI reporting UE) may forwards the MAC CE for activation, if needed (e.g., if only one of the CSI Triggering UE or CSI Reporting UE is in communication with the managing entity). At step 6B, the CSI reporting UE (or CSI triggering UE) responds with an ACK to indicate acceptance.

As an alternative, or in addition, at step 7, the managing entity may send a dynamic indication of sidelink component carriers. For example, a gNB may send a CSI request and CSI report component carrier(s) via DCI3 on Uu interface or an RSU or Lead UE or a scheduling UE may send a CSI request and CSI report component carrier(s) via SCI2 on PC5 interface.

At step 8, the CSI triggering UE (or CSI reporting UE) sends a CSI request and indicates the CSI report component carrier(s) via SCI2 on one or more sidelink carriers.

At step 9, the CSI reporting UE sends the CSI report(s) on the indicated sidelink component carrier(s).

For the cases or alternatives described for FIG. 13, the messages or control signals exchanged between a gNB and CSI triggering UE or CSI reporting UE may be carried on a carrier pre-configured, configured, or selected and activated for Uu control plane; the messages or control signals exchanged between an RSU or Lead UE or scheduling UE and CSI triggering UE or CSI reporting UE may be carried on a carrier pre-configured, configured, or selected and activated for PC5 control plane; the messages or control signals exchanged between CSI triggering UE or CSI reporting UE may be carried on a carrier pre-configured, configured, or selected and activated for PC5 control plane between these two UEs.

As described above, the CSI reports may be sent in separate MAC CEs or multiple CSI reports could be aggregated in a single MAC CE.

Figure 14:
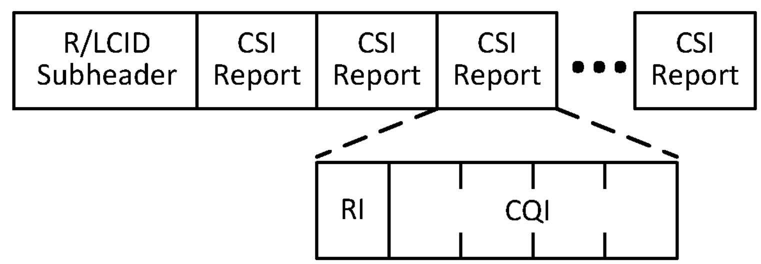
FIG. 14 illustrates example medium access control (MAC) control elements (CE) for cross-carrier CSI reporting for sidelink, in accordance with certain aspects of the present disclosure.
Figure 14:
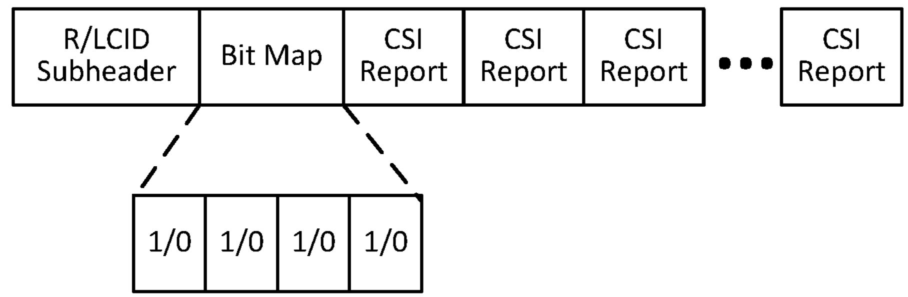

FIG. 14 illustrates two examples of MAC CEs that may aggregate multiple CSI reports. In a first MA CE 1400A, there may be an implicit association with CSI requests. For example, CSI reports may be ordered in the MAC CE according to the order of sidelink component carriers associated with the corresponding CSI requests transmitted by the CSI triggering UE. In a second MAC CE 1400B, there may be an explicit association with CSI requests. For example, the MAC CE 1400B may include a Bit Map field that indicates the component carriers associated with CSI reports transmitted by the CSI reporting UE.

While the MAC CE 1400B has an additional field relative to the MAC CE 1400A, the signaling overhead may be offset by having a flexible size (as opposed to a possible fixed size of MAC CE 1400A). In other words, the MAC CE 1400B may only include CSI report fields for component carriers indicated (e.g., with a corresponding "1" bit) in the Bit Map field.

Example Wireless Communication Devices

Figure 15:
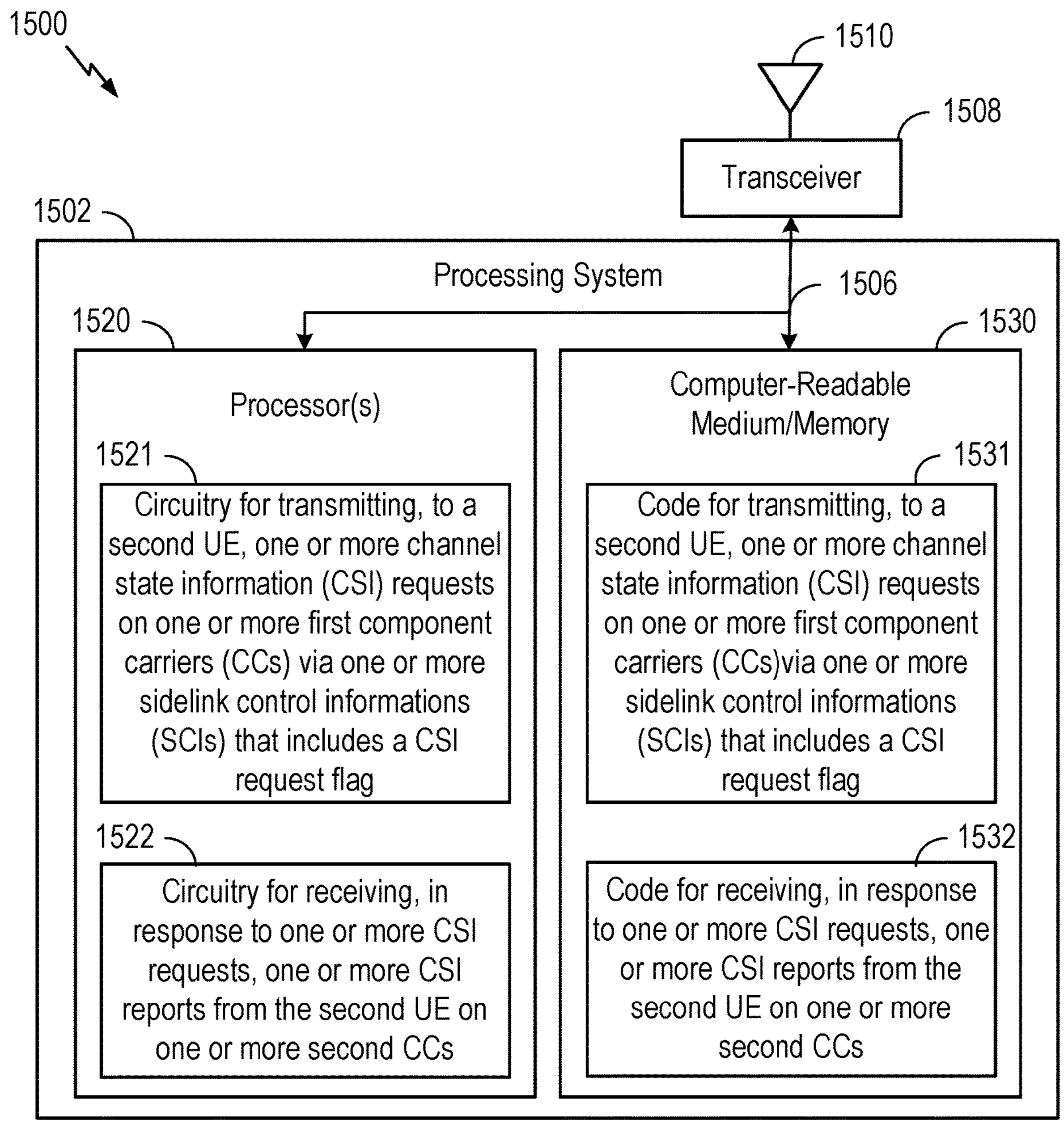
FIG. 15-17 depict devices with example components capable of performing operations for cross-carrier CSI reporting, in accordance with aspects of the present disclosure.

FIG. 15 depicts an example communications device 1500 that includes various components operable, configured, or adapted to perform operations for the techniques disclosed herein, such as the operations depicted and described with respect to FIGS. 6-14. In some examples, communication device 1500 may be a user equipment 104 as described, for example with respect to FIGS. 1 and 2.

Communications device 1500 includes a processing system 1502 coupled to a transceiver 1508 (e.g., a transmitter and/or a receiver). Transceiver 1508 is configured to transmit (or send) and receive signals for the communications device 1500 via an antenna 1510, such as the various signals as described herein. Processing system 1502 may be configured to perform processing functions for communications device 1500, including processing signals received and/or to be transmitted by communications device 1500.

Processing system 1502 includes one or more processors 1520 coupled to a computer-readable medium/memory 1530 via a bus 1506. In certain aspects, computer-readable medium/memory 1530 is configured to store instructions (e.g., computer-executable code) that when executed by the one or more processors 1520, cause the one or more processors 1520 to perform the operations illustrated in FIGS. 6-14, or other operations for performing the various techniques discussed herein for coordination of carrier selection between long term evolution (LTE) and new radio (NR) sidelink (SL).

In the depicted example, computer-readable medium/memory 1530 stores code 1531 (e.g., an example of means for) for transmitting, to a second UE, one or more channel state information (CSI) requests on one or more first component carriers (CCs) via one or more sidelink control informations (SCIs) that includes a CSI request flag; code 1532 (e.g., an example of means for) for receiving, in response to one or more CSI requests, one or more CSI reports from the second UE on one or more second CCs.

In the depicted example, the one or more processors 1520 include circuitry configured to implement the code stored in the computer-readable medium/memory 1530, including circuitry 1521 (e.g., an example of means for) for transmitting, to a second UE, one or more channel state information (CSI) requests on one or more first component carriers (CCs) via one or more sidelink control informations (SCIs) that includes a CSI request flag; circuitry 1522 (e.g., an example of means for) for receiving, in response to one or more CSI requests, one or more CSI reports from the second UE on one or more second CCs.

Various components of communications device 1500 may provide means for performing the methods described herein, including with respect to FIGS. 6-14.

In some examples, means for transmitting or sending (or means for outputting for transmission) may include the transceivers 254 and/or antenna(s) 252 of the user equipment 104 illustrated in FIG. 2 and/or transceiver 1508 and antenna 1510 of the communication device 1500 in FIG. 15.

In some examples, means for receiving (or means for obtaining) may include the transceivers 254 and/or antenna (s) 252 of the user equipment 104 illustrated in FIG. 2 and/or transceiver 1508 and antenna 1510 of the communication device 1500 in FIG. 15.

In some examples, means for providing, means for generating, and/or means for selecting may include various processing system components, such as: the one or more processors 1520 in FIG. 15, or aspects of the user equipment 104 depicted in FIG. 2, including receive processor 258, transmit processor 264, TX MIMO processor 266, and/or controller/processor 280 (including SL component 281).

Notably, FIG. 15 is just use example, and many other examples and configurations of communication device 1500 are possible.

Figure 16:
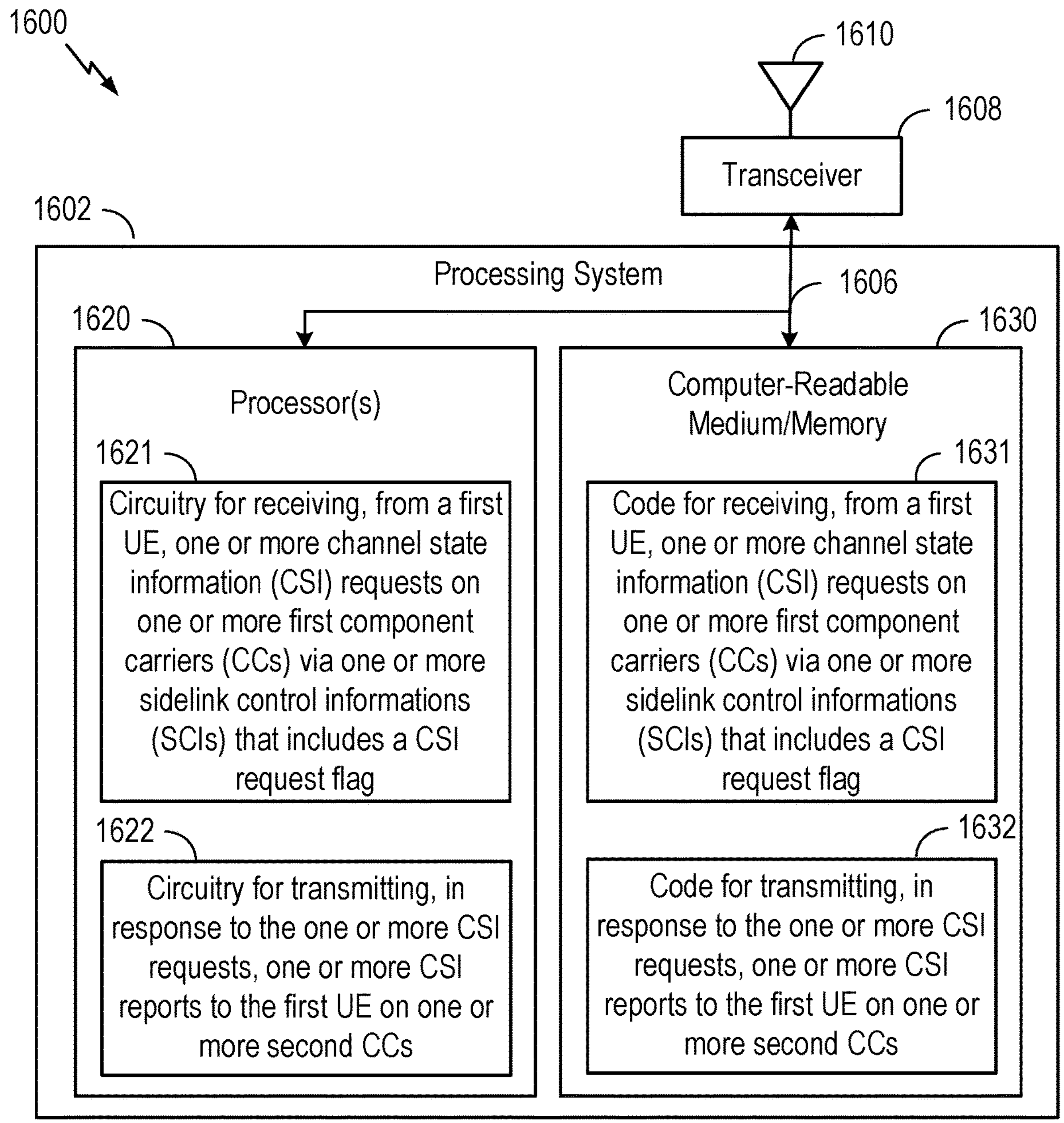

FIG. 16 depicts an example communications device 1600 that includes various components operable, configured, or adapted to perform operations for the techniques disclosed herein, such as the operations depicted and described with respect to FIGS. 6-14. In some examples, communication device 1600 may be a user equipment 104 as described, for example with respect to FIGS. 1 and 2.

Communications device 1600 includes a processing system 1602 coupled to a transceiver 1608 (e.g., a transmitter and/or a receiver). Transceiver 1608 is configured to transmit (or send) and receive signals for the communications device 1600 via an antenna 1610, such as the various signals as described herein. Processing system 1602 may be configured to perform processing functions for communications device 1600, including processing signals received and/or to be transmitted by communications device 1600.

Processing system 1602 includes one or more processors 1620 coupled to a computer-readable medium/memory 1630 via a bus 1606. In certain aspects, computer-readable medium/memory 1630 is configured to store instructions (e.g., computer-executable code) that when executed by the one or more processors 1620, cause the one or more processors 1620 to perform the operations illustrated in FIGS. 6-14, or other operations for performing the various techniques discussed herein for coordination of carrier selection between long term evolution (LTE) and new radio (NR) sidelink (SL).

In the depicted example, computer-readable medium/memory 1630 stores code 1631 (e.g., an example of means for) for receiving, from a first UE, one or more channel state information (CSI) requests on one or more first component carriers (CCs) via one or more sidelink control informations (SCIs) that includes a CSI request flag; code 1632 (e.g., an example of means for) for transmitting, in response to the one or more CSI requests, one or more CSI reports to the first UE on one or more second CCs.

In the depicted example, the one or more processors 1620 include circuitry configured to implement the code stored in the computer-readable medium/memory 1630, including circuitry 1621 (e.g., an example of means for) for receiving, from a first UE, one or more channel state information (CSI) requests on one or more first component carriers (CCs) via one or more sidelink control informations (SCIs) that includes a CSI request flag; circuitry 1622 (e.g., an example of means for) for transmitting, in response to the one or more CSI requests, one or more CSI reports to the first UE on one or more second CCs.

Various components of communications device 1600 may provide means for performing the methods described herein, including with respect to FIGS. 6-14.

In some examples, means for transmitting or sending (or means for outputting for transmission) may include the transceivers 254 and/or antenna(s) 252 of the user equipment 104 illustrated in FIG. 2 and/or transceiver 1608 and antenna 1610 of the communication device 1600 in FIG. 16.

In some examples, means for receiving (or means for obtaining) may include the transceivers 254 and/or antenna(s) 252 of the user equipment 104 illustrated in FIG. 2 and/or transceiver 1608 and antenna 1610 of the communication device 1600 in FIG. 16.

In some examples, means for providing, means for generating, and/or means for selecting may include various processing system components, such as: the one or more processors 1620 in FIG. 16, or aspects of the user equipment 104 depicted in FIG. 2, including receive processor 258, transmit processor 264, TX MIMO processor 266, and/or controller/processor 280 (including SL component 281).

Notably, FIG. 16 is just use example, and many other examples and configurations of communication device 1600 are possible.

Figure 17:
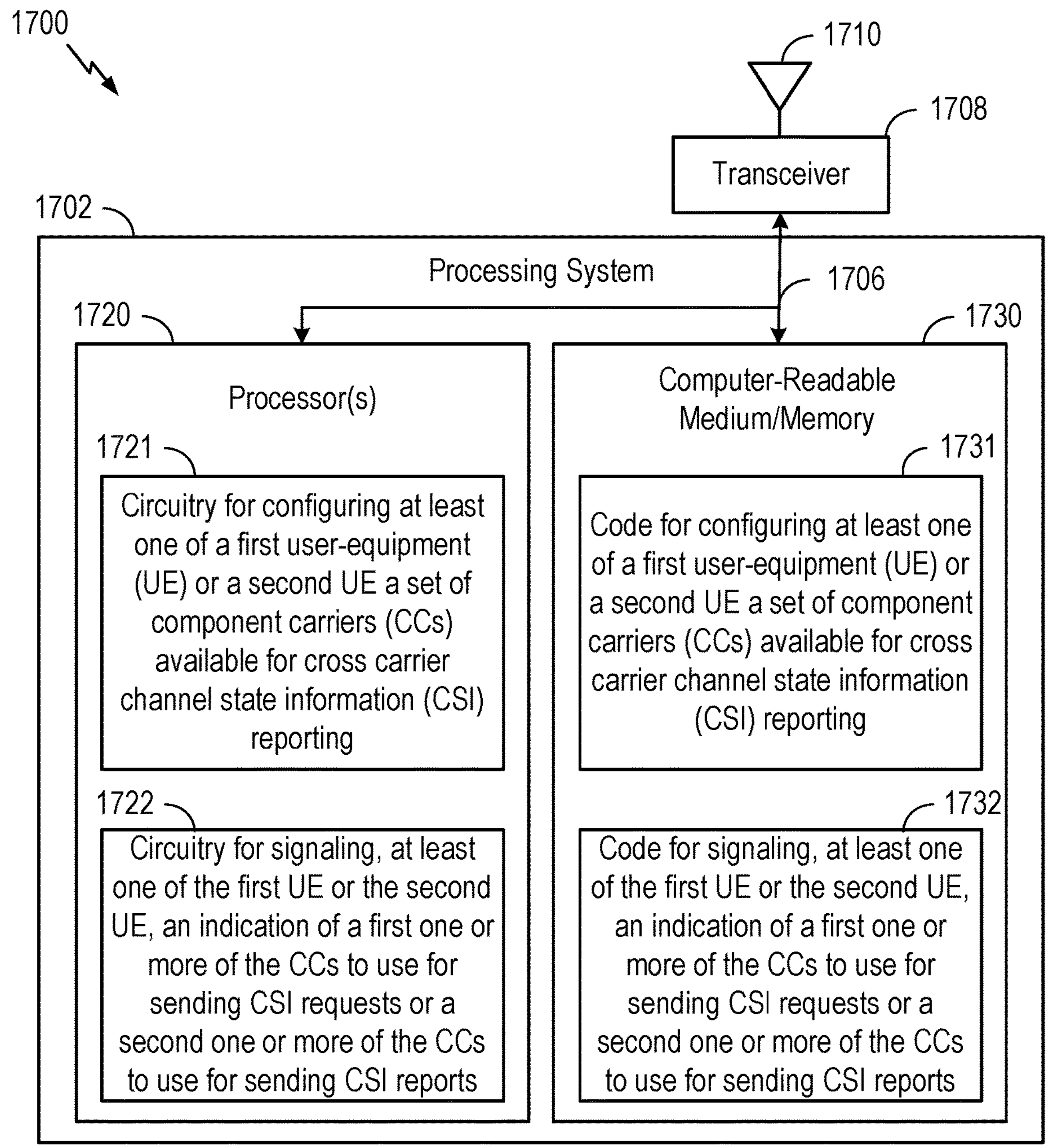

FIG. 17 depicts an example communications device 1700 that includes various components operable, configured, or adapted to perform operations for the techniques disclosed herein, such as the operations depicted and described with respect to FIGS. 6-14. In some examples, communication device 1700 may be a user equipment 104 as described, for example with respect to FIGS. 1 and 2.

Communications device 1700 includes a processing system 1702 coupled to a transceiver 1708 (e.g., a transmitter and/or a receiver). Transceiver 1708 is configured to transmit (or send) and receive signals for the communications device 1700 via an antenna 1710, such as the various signals as described herein. Processing system 1702 may be configured to perform processing functions for communications device 1700, including processing signals received and/or to be transmitted by communications device 1700.

Processing system 1702 includes one or more processors 1720 coupled to a computer-readable medium/memory 1730 via a bus 1706. In certain aspects, computer-readable medium/memory 1730 is configured to store instructions (e.g., computer-executable code) that when executed by the one or more processors 1720, cause the one or more processors 1720 to perform the operations illustrated in FIGS. 6-14, or other operations for performing the various techniques discussed herein for coordination of carrier selection between long term evolution (LTE) and new radio (NR) sidelink (SL).

In the depicted example, computer-readable medium/memory 1730 stores code 1731 (e.g., an example of means for) for configuring at least one of a first user-equipment (UE) or a second UE a set of component carriers (CCs) available for cross carrier channel state information (CSI) reporting; and code 1732 (e.g., an example of means for) for signaling, at least one of the first UE or the second UE, an indication of a first one or more of the CCs to use for sending CSI requests or a second one or more of the CCs to use for sending CSI reports.

In the depicted example, the one or more processors 1720 include circuitry configured to implement the code stored in the computer-readable medium/memory 1730, including circuitry 1721 (e.g., an example of means for) for configuring at least one of a first user-equipment (UE) or a second UE a set of component carriers (CCs) available for cross carrier channel state information (CSI) reporting; and circuitry 1722 (e.g., an example of means for) for signaling, at least one of the first UE or the second UE, an indication of a first one or more of the CCs to use for sending CSI requests or a second one or more of the CCs to use for sending CSI reports.

Various components of communications device 1700 may provide means for performing the methods described herein, including with respect to FIGS. 6-14.

In some examples, means for transmitting or sending (or means for outputting for transmission) may include the transceivers 254 and/or antenna(s) 252 of the user equipment 104 illustrated in FIG. 2 and/or transceiver 1708 and antenna 1710 of the communication device 1700 in FIG. 17.

In some examples, means for receiving (or means for obtaining) may include the transceivers 254 and/or antenna (s) 252 of the user equipment 104 illustrated in FIG. 2 and/or transceiver 1708 and antenna 1710 of the communication device 1700 in FIG. 17.

In some examples, means for providing, means for generating, and/or means for selecting may include various processing system components, such as: the one or more processors 1720 in FIG. 17, or aspects of the user equipment 104 depicted in FIG. 2, including receive processor 258, transmit processor 264, TX MIMO processor 266, and/or controller/processor 280 (including SL component 281).

Notably, FIG. 17 is just use example, and many other examples and configurations of communication device 1700 are possible.

Example Clauses

Implementation examples are described in the following numbered clauses:

Clause 1: A method for wireless communication by a first user-equipment (UE), comprising: transmitting, to a second UE, one or more channel state information (CSI) requests on one or more first component carriers (CCs), via one or more sidelink control informations (SCIs) that includes a CSI request flag; and receiving, in response to the one or more CSI requests, one or more CSI reports from the second UE on one or more second CCs.

Clause 2: The method of Clause 1, wherein the SCI also includes a carrier index indicating a CC on which a corresponding CSI report is to be transmitted.

Clause 3: The method of any one of Clauses 1-2, wherein: the one or more first CCs are in a first frequency band; and the one or more second CCs are in a second frequency band.

Clause 4: The method of Clause 3, wherein: the first frequency band comprises an unlicensed frequency band; and the second frequency band comprises a licensed frequency band.

Clause 5: The method of any one of Clauses 1-4, further comprising signaling the second UE an indication of the one or more second CCs.

Clause 6: The method of Clause 5, wherein the signaling: semi-statically activates the one or more second CCs; or dynamically indicates the one or more second CCs.

Clause 7: The method of Clause 5, further comprising selecting at least one of the one or more first CCs or the one or more second CCs.

Clause 8: The method of any one of Clauses 1-7, further comprising receiving signaling, from a wireless entity, indicating the one or more second CCs.

Clause 9: The method of Clause 8, wherein the signaling: semi-statically activates the one or more second CCs; or dynamically indicates the one or more second CCs.

Clause 10: The method of any one of Clauses 1-9, wherein: the one or more CSI requests comprises multiple CSI requests sent on different CCs; and receiving the one or more CSI reports comprises receiving multiple CSI medium access control (MAC) control elements (CEs), each corresponding to one of the CSI requests.

Clause 11: The method of any one of Clauses 1-10, wherein: the one or more CSI requests comprises multiple CSI requests sent on different CCs; and receiving the one or more CSI reports comprises receiving a CSI medium access control (MAC) control elements (CE) aggregating CSI reports corresponding to the CSI requests.

Clause 12: A method for wireless communication by a second user-equipment (UE), comprising: receiving, from a first UE, one or more channel state information (CSI) requests on one or more first component carriers (CCs) via one or more sidelink control informations (SCIs) that includes a CSI request flag; and transmitting, in response to the one or more CSI requests, one or more CSI reports to the first UE on one or more second CCs.

Clause 13: The method of Clause 12, wherein the SCI also includes a carrier index indicating a CC on which a corresponding CSI report is to be transmitted.

Clause 14: The method of any one of Clauses 12-13, wherein: the one or more first CCs are in a first frequency band; and the one or more second CCs are in a second frequency band.

Clause 15: The method of Clause 14, wherein: the first frequency band comprises an unlicensed frequency band; and the second frequency band comprises a licensed frequency band.

Clause 16: The method of any one of Clauses 12-15, further comprising receiving, from the first UE, an indication of the one or more second CCs.

Clause 17: The method of Clause 16, wherein the signaling: semi-statically activates the one or more second CCs; or dynamically indicates the one or more second CCs.

Clause 18: The method of any one of Clauses 12-17, further comprising receiving signaling, from a wireless entity, indicating the one or more second CCs.

Clause 19: The method of Clause 18, wherein the signaling: semi-statically activates the one or more second CCs; or dynamically indicates the one or more second CCs.

Clause 20: The method of any one of Clauses 12-19, wherein: the one or more CSI requests comprises multiple CSI requests sent on different CCs; and transmitting the one or more CSI reports comprises transmitting multiple CSI medium access control (MAC) control elements (CEs), each corresponding to one of the CSI requests.

Clause 21: The method of any one of Clauses 12-20, wherein: the one or more CSI requests comprises multiple CSI requests sent on different CCs; and transmitting the one or more CSI reports comprises transmitting a CSI medium access control (MAC) control elements (CE) aggregating CSI reports corresponding to the CSI requests.

Clause 22: A method for wireless communication by a wireless network entity, comprising: configuring at least one of a first user-equipment (UE) or a second UE a set of component carriers (CCs) available for cross carrier channel state information (CSI) reporting; and signaling, at least one of the first UE or the second UE, an indication of a first one or more of the CCs to use for sending CSI requests or a second one or more of the CCs to use for sending CSI reports.

Clause 23: The method of Clause 22, wherein the signaling semi-statically activates the one or more second CCs.

Clause 24: The method of any one of Clauses 22-23, wherein the signaling dynamically indicates the one or more second CCs.

Clause 25: The method of any one of Clauses 22-24, wherein: the first one or more CCs are in a first frequency band; and the second one or more CCs are in a second frequency band.

Clause 26: The method of Clause 25, wherein: the first frequency band comprises an unlicensed frequency band; and the second frequency band comprises a licensed frequency band.

Clause 27: An apparatus for wireless communications, comprising means for performing the method of any one or more of Clauses 1-26.

Clause 28: An apparatus for wireless communications, comprising a memory and a processor coupled with the memory, the memory and the processor configured to perform the method of any one or more of Clauses 1-26.

Clause 29: A computer-readable medium having instructions stored thereon which, when executed by a processor, performs the method of any one or more of Clauses 1-26.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). ABS for a macro cell may be referred to as a macro BS. ABS for a pico cell may be referred to as a pico BS. A BS for a femto cell may be referred to as a femto BS or a home BS.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with core network 190 through second backhaul links 184. Base stations 102 may communicate directly or indirectly (e.g., through the EPC 160 or core network 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. The gNB 180 may also communicate with one or more UEs 104 via a beam formed connection 182 (e.g., via beams 182' and 182").

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink (SL) channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

Core network 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and core network 190. Generally, AMF 192 provides QoS flow and session management.

All user Internet protocol (IP) packets are transferred through UPF 195, which is connected to the IP Services 197, and which provides UE IP address allocation as well as other functions for core network 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times 15$ kHz, where μ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of NR and LTE sidelink co-channel co-existence in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications by a first user-equipment (UE), comprising:
a memory; and
one or more processors coupled with the memory, the memory and the one or more processors configured to cause the first UE to:
transmit, to a second UE, one or more channel state information (CSI) requests on one or more first component carriers (CCs), via one or more sidelink control information (SCIs) that includes a CSI request flag and a carrier index indicating a CC on which a corresponding CSI report is to be transmitted; and
receive, in response to the one or more CSI requests, one or more CSI reports from the second UE on one or more second CCs.

2. The apparatus of claim 1, wherein:
the one or more first CCs are in a first frequency band; and
the one or more second CCs are in a second frequency band.

3. The apparatus of claim 2, wherein:
the first frequency band comprises an unlicensed frequency band; and
the second frequency band comprises a licensed frequency band.

4. The apparatus of claim 1, wherein the memory and the one or more processors are further configured to cause the first UE to transmit signaling to the second UE indicating the one or more second CCs.

5. The apparatus of claim 4, wherein the signaling:
semi-statically activates the one or more second CCs; or
dynamically indicates the one or more second CCs.

6. The apparatus of claim 4, wherein the memory and the one or more processors are further configured to cause the first UE to select at least one of the one or more first CCs or the one or more second CCs.

7. The apparatus of claim 1, wherein the memory and the one or more processors are further configured to cause the UE to receive signaling, from a wireless entity, indicating the one or more second CCs.

8. The apparatus of claim 7, wherein the signaling:
semi-statically activates the one or more second CCs; or
dynamically indicates the one or more second CCs.

9. An apparatus for wireless communications by a first user-equipment (UE), comprising:
a memory; and
one or more processors coupled with the memory, the memory and the one or more processors configured to cause the first UE to:
transmit, to a second UE, multiple channel state information (CSI) requests on different first component carriers (CCs), via at least one sidelink control information (SCI) that includes a CSI request flag; and
receive, in response to the one or more CSI requests, one or more CSI reports from the second UE on one or more second CCs, wherein the memory and the one or more processors are configured to cause the first UE to:
receive multiple CSI medium access control (MAC) control elements (CEs), each corresponding to one of the CSI requests, or
receive a CSI MAC CE aggregating the one or more CSI reports corresponding to the one or more CSI requests.

10. An apparatus for wireless communications by a second user-equipment (UE), comprising:
a memory; and
one or more processors coupled with the memory, the memory and the one or more processors configured to cause the second UE to:
receive, from a first UE, one or more channel state information (CSI) requests on one or more first component carriers (CCs) via one or more sidelink control information (SCI) that includes a CSI request flag and a carrier index indicating a CC on which a corresponding CSI report is to be transmitted; and
transmit, in response to the one or more CSI requests, one or more CSI reports to the first UE on one or more second CCs.

11. The apparatus of claim 10, wherein:
the one or more first CCs are in a first frequency band; and
the one or more second CCs are in a second frequency band.

12. The apparatus of claim 11, wherein:
the first frequency band comprises an unlicensed frequency band; and
the second frequency band comprises a licensed frequency band.

13. The apparatus of claim 10, wherein the memory and the one or more processors are further configured to cause the second UE to receive signaling, from the first UE, indicating the one or more second CCs.

14. The apparatus of claim 13, wherein the signaling:
semi-statically activates the one or more second CCs; or
dynamically indicates the one or more second CCs.

15. The apparatus of claim 10, wherein the memory and the one or more processors are further configured to cause the second UE to receive signaling, from a wireless entity, indicating the one or more second CCs.

16. The apparatus of claim 15, wherein the signaling:
semi-statically activates the one or more second CCs; or
dynamically indicates the one or more second CCs.

17. An apparatus for wireless communications by a second user-equipment (UE), comprising:
a memory; and
one or more processors coupled with the memory, the memory and the one or more processors configured to cause the second UE to:
receive, from a first UE, multiple channel state information (CSI) requests on different first component carriers (CCs) via one or more sidelink control information (SCI) that includes a CSI request flag and a carrier index indicating a CC on which a corresponding CSI report is to be transmitted; and
transmit, in response to the one or more CSI requests, one or more CSI reports to the first UE on one or more second CCs, wherein the memory and the one or more processors are configured to cause the second UE to:

transmit multiple CSI medium access control (MAC) control elements (CEs), each corresponding to one of the CSI requests, or transmit a CSI MAC CE aggregating CSI reports corresponding to the CSI requests.

18. An apparatus for wireless communications by a wireless network entity, comprising:

a memory; and one or more processors coupled with the memory, the memory and the one or more processors configured to cause the wireless network entity to:

configure at least one of a first user-equipment (UE) or a second UE with a set of component carriers (CCs) available for cross carrier channel state information (CSI) reporting; and transmit signaling, to at least one of the first UE or the second UE, of indicating a first one or more of the CCs to use for sending CSI requests or a second one or more of the CCs to use for sending CSI reports, wherein the signaling semi-statically activates the one or more second CCs.

19. The apparatus of claim 18, wherein:

the first one or more CCs are in a first frequency band; and the second one or more CCs are in a second frequency band.

20. The apparatus of claim 19, wherein:

the first frequency band comprises an unlicensed frequency band; and the second frequency band comprises a licensed frequency band.

21. A method for wireless communication by a first user-equipment (UE), comprising:

transmitting, to a second UE, one or more channel state information (C SI) requests on one or more first component carriers (CCs), via one or more sidelink control information (SCI) that includes a CSI request flag and a carrier index indicating a CC on which a corresponding CSI report is to be transmitted; and receiving, in response to the one or more CSI requests, one or more CSI reports from the second UE on one or more second CCs.

22. The method of claim 21, wherein:

the one or more first CCs are in a first frequency band; and the one or more second CCs are in a second frequency band.

23. The method of claim 22, wherein:

the first frequency band comprises an unlicensed frequency band; and the second frequency band comprises a licensed frequency band.

* * * * *